US012723598B2

(12) United States Patent
O'Meara et al.

(10) Patent No.: US 12,723,598 B2
(45) Date of Patent: Sep. 1, 2026

(54) CENTRIFUGAL COMPRESSOR WITH CONTROLLED TOLERANCE STACK AND METHODS OF ASSEMBLING THE SAME

(71) Applicant: Copeland LP, Sidney, OH (US)

(72) Inventors: Patrick Shawn O'Meara, Tipp City, OH (US); Michael M. Perevozchikov, Tipp City, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 19/012,463

(22) Filed: Jan. 7, 2025

(65) Prior Publication Data

US 2026/0194072 A1 Jul. 9, 2026

(51) Int. Cl.

| | |
|---|---|
| ***F04D 29/62*** | (2006.01) |
| ***F04D 25/06*** | (2006.01) |
| ***F04D 29/056*** | (2006.01) |
| ***F04D 29/16*** | (2006.01) |
| ***F04D 29/42*** | (2006.01) |
| *F16C 17/02* | (2006.01) |

(52) U.S. Cl.

CPC ........... *F04D 29/624* (2013.01); *F04D 25/06* (2013.01); *F04D 29/056* (2013.01); *F04D 29/162* (2013.01); *F04D 29/4206* (2013.01); *F16C 17/024* (2013.01)

(58) Field of Classification Search

CPC ...... F04D 29/624; F04D 25/06; F04D 29/056; F04D 29/162; F04D 29/4206; F16C 17/024; F01D 25/162

See application file for complete search history.

(56) References Cited

U.S. PATENT DOCUMENTS

| | | | |
|---|---|---|---|
| 5,857,348 | A | 1/1999 | Conry |
| 6,997,686 | B2 | 2/2006 | Agrawal et al. |
| 8,511,981 | B2 | 8/2013 | Small et al. |
| 11,306,726 | B2 | 4/2022 | Perevozchikov et al. |
| 11,391,291 | B2 | 7/2022 | Groshek et al. |
| 11,560,900 | B2 | 1/2023 | Wilkes et al. |
| 11,686,341 | B2 | 6/2023 | Liu et al. |
| 11,852,153 | B1 * | 12/2023 | O'Meara ............... F04D 17/122 |
| 12,188,701 | B2 | 1/2025 | Perevozchikov et al. |
| 2003/0133819 | A1 | 7/2003 | Perevozchikov |
| 2003/0136145 | A1 | 7/2003 | Perevozchikov et al. |
| 2006/0233657 | A1 | 10/2006 | Bonear et al. |
| 2009/0116977 | A1 | 5/2009 | Perevozchikov et al. |
| 2009/0297379 | A1 | 12/2009 | Stover et al. |
| 2011/0033328 | A1 | 2/2011 | Stover et al. |

(Continued)

OTHER PUBLICATIONS

Extended European Search Report for Patent Application No. 26150168.8 dated Jun. 9, 2026; 10 pp.

*Primary Examiner* — Essama Omgba
*Assistant Examiner* — Lilya Pekarskaya
(74) *Attorney, Agent, or Firm* — Armstrong Teasdale LLP

(57) ABSTRACT

A centrifugal compressor includes a compressor housing, a motor and a rotatable shaft. A bearing housing defines a center bore that receives the shaft, and a volute assembly is positioned in the socket adjacent the bearing housing. The volute assembly has a back axial surface facing the bearing housing, stops protruding from the back axial surface. The stops abut the datum to limit tolerance stack between the bearing housing and the volute assembly. Each of the bearing housing and the volute assembly are secured to the datum.

14 Claims, 27 Drawing Sheets

(56) References Cited

U.S. PATENT DOCUMENTS

| | | | |
|---|---|---|---|
| 2014/0069139 | A1 | 3/2014 | Perevozchikov et al. |
| 2014/0134031 | A1 | 5/2014 | Doepker et al. |
| 2014/0216103 | A1 | 8/2014 | Ignatiev et al. |
| 2014/0219846 | A1 | 8/2014 | Ignatiev et al. |
| 2014/0241909 | A1 | 8/2014 | Perevozchikov et al. |
| 2014/0356209 | A1 | 12/2014 | Ignatiev et al. |
| 2015/0118091 | A1 | 4/2015 | Ignatiev et al. |
| 2016/0025094 | A1 | 1/2016 | Ignatiev et al. |
| 2016/0123314 | A1 | 5/2016 | Ignatiev et al. |
| 2016/0160860 | A1 | 6/2016 | Perevozchikov |
| 2016/0222967 | A1 | 8/2016 | Ignatiev et al. |
| 2017/0138643 | A1 | 5/2017 | Ignatiev et al. |
| 2018/0066657 | A1 | 3/2018 | Perevozchikov et al. |
| 2019/0101120 | A1 | 4/2019 | Perevozchikov et al. |
| 2019/0186491 | A1 | 6/2019 | Perevozchikov et al. |
| 2020/0256347 | A1* | 8/2020 | Groshek ............... F16C 37/002 |
| 2021/0310371 | A1* | 10/2021 | Spathias ............. F16C 32/0614 |
| 2021/0381522 | A1* | 12/2021 | Wilkes .................. F04D 29/284 |
| 2022/0003238 | A1 | 1/2022 | Liu et al. |
| 2022/0065513 | A1 | 3/2022 | Oakley et al. |
| 2022/0196025 | A1 | 6/2022 | Perevozchikov et al. |
| 2022/0220976 | A1 | 7/2022 | Perevozchikov et al. |
| 2022/0243762 | A1 | 8/2022 | Liu et al. |
| 2022/0325634 | A1* | 10/2022 | Deshpande ........... F01D 25/243 |
| 2023/0235935 | A1 | 7/2023 | Perevozchikov et al. |
| 2024/0159244 | A1* | 5/2024 | O'Meara ............... F04D 29/056 |
| 2024/0318659 | A1* | 9/2024 | Perevozchikov ..... F04D 29/462 |
| 2024/0426305 | A1 | 12/2024 | Nayak |

* cited by examiner 818
824
820
816
806
822
810
820
824
824
824
162
802
824
816
814
810
824
808
162
802
812
806
804
812
804
808
810
824
824
162
802
816
822
820
816

CENTRIFUGAL COMPRESSOR WITH CONTROLLED TOLERANCE STACK AND METHODS OF ASSEMBLING THE SAME

FIELD

The field relates generally to compressors and, more particularly, to centrifugal compressors and methods of assembling centrifugal compressors.

BACKGROUND

Centrifugal compressors have advantages over positive displacement compressor designs, such as reciprocating, rotary, and screw compressors. A centrifugal compressor typically operates with a relatively high rotational speed of the driveshaft and impeller. This high speed presents challenges for providing a suitable operating environment for the driveshaft, impeller, and associated motor. To mitigate the challenges associated with the high-rotational speed driveshafts, centrifugal compressors typically require relatively tight tolerances and high manufacturing accuracy. Loosening and/or misalignment of compressor components (e.g., bearings or seals) mounted on or in relation to the driveshaft may occur during operation, creating eccentric loads which result in whirling and vibrations, subjecting the driveshaft to cyclic stress loadings, and resulting in decreased operational lifespans and premature failures.

The design and configuration of compressor components mounted on and/or in relation to the driveshaft and impeller presents a challenge for achieving and maintaining axial alignment between the driveshaft and the components. Furthermore, maintaining alignment of the center of gravity of the components coincident with the axis of rotation of the driveshaft during high-rotational operating speeds facilitates avoiding eccentric loads that lead to vibrations which may damage components of the centrifugal compressor.

A compressor and assembly method with reduced tolerance stack between compressor components to mitigate the risk of compressor component misalignment and improve compressor performance and operation lifetime is needed.

This background section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method includes assembling a compressor that includes a compressor housing, the compressor housing having a datum. The method includes positioning a motor and a rotatable shaft in the compressor housing, and positioning a bearing housing in the compressor housing. The bearing housing defines a center bore that receives the shaft, and positioning the bearing housing includes abutting the datum with the bearing housing and aligning the compressor housing with the bearing housing using a first fit band. The method also includes positioning a volute assembly in the compressor housing adjacent the bearing housing. The volute assembly includes a back axial surface facing the bearing housing, one or more stops protruding from the back axial surface, and a second fit band. Positioning the volute assembly includes abutting the datum with the one or more stops and aligning the compressor housing with the volute assembly using the second fit band. Abutting the datum with the bearing housing and the one or more stops limits axial tolerance stack between the bearing housing and the volute assembly. The first fit band and the second fit band limit axial tolerance stack to the centerline of the compressor housing.

In another aspect, a compressor includes a compressor housing having a motor area, a socket, and a datum between the motor area and the socket. The compressor also includes a motor and a rotatable shaft positioned in the motor area. The compressor also includes a bearing housing positioned in the compressor housing. The bearing housing defines a center bore that receives the shaft. The bearing housing abuts the datum where a volute assembly is positioned in the socket adjacent the bearing housing. The volute assembly includes a back axial surface facing the bearing housing and stops protruding from the back axial surface. The stops abut the datum to limit tolerance stack between the bearing housing and the volute assembly. The bearing housing and the volute assembly are secured to the datum. The compressor also includes a first fit band positioned between the compressor housing and the bearing housing to radially align the bearing housing with the centerline of the compressor housing. The compressor also includes a second fit band positioned between the compressor housing and the volute assembly to radially align the volute assembly to the centerline of the compressor housing.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

This disclosure relates to compressors with controlled tolerance stack between components of the compressor, and methods of assembling compressors with controlled tolerance stack. Compressors operate using rotating shafts, a compression component (e.g., an impeller) supported by the shaft, and associated components, such as bearings and fluid seals, that support the shaft, control (e.g., limit or inhibit) fluid leakage in the compressor, and/or otherwise enable the compressor to function effectively and efficiently. Tolerance stack can result in axial misalignment between the associated components which creates the risk for damage to the compressor, operational failure, and costly downtime and maintenance. The compressors of the present disclosure, and the methods of assembling the compressors, facilitate controlling tolerance stack in an efficient, reliable, and cost-effective manner by using a common datum of the compressor housing for locating and aligning adjacent components, while reducing the number of connections between adjacent components that are needed to assemble the compressor. Compressors in accordance with the present disclosure can also be easily and quickly assembled, increasing throughput and decreasing manufacturing and material costs.

For conciseness, examples will be described with respect to a two-stage centrifugal compressor. However, the methods and systems described herein may be applied to other suitable compressors, including single-stage centrifugal compressors.

Figure 1:
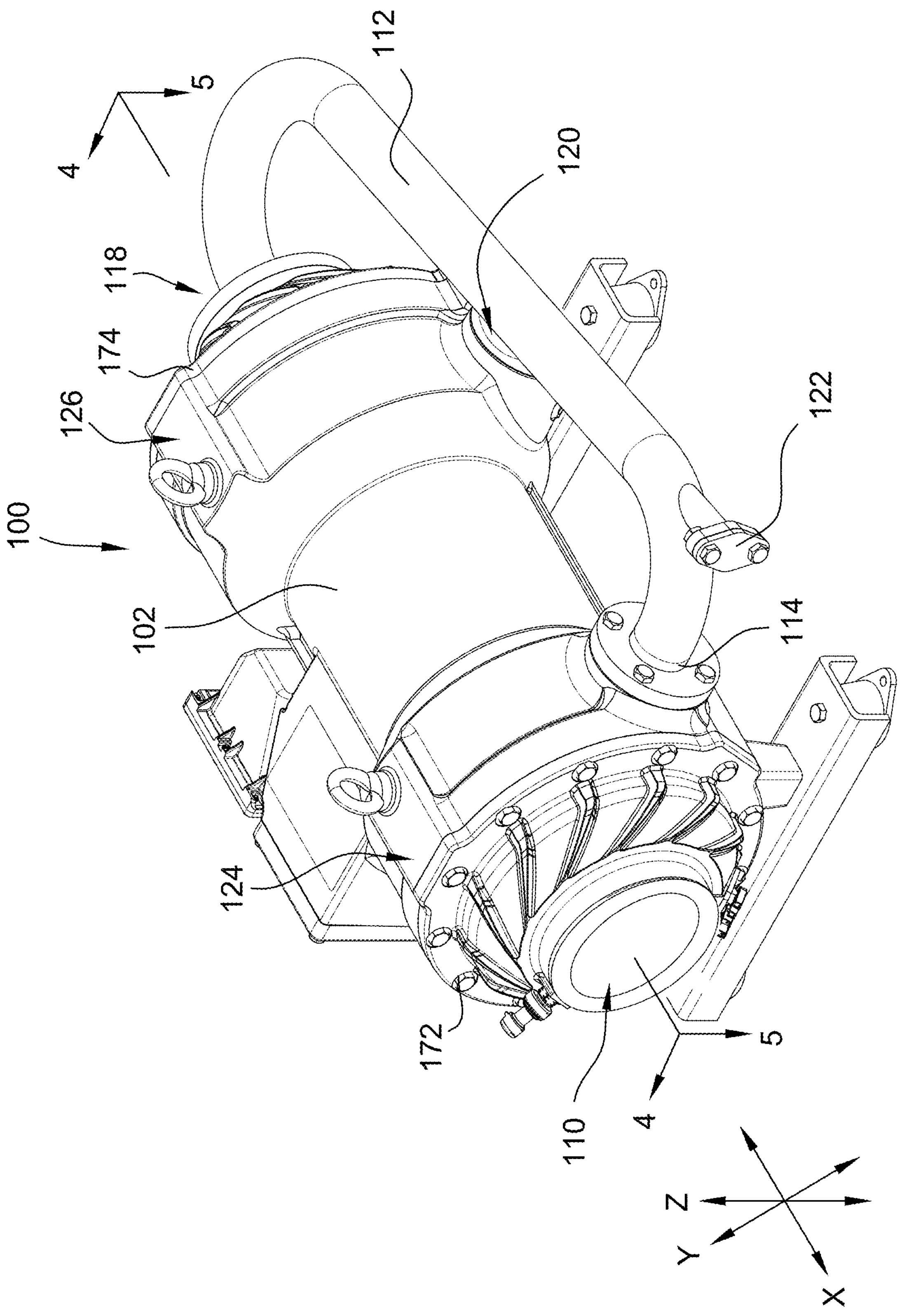
FIG. 1 is a perspective of an example compressor.
Figure 2:
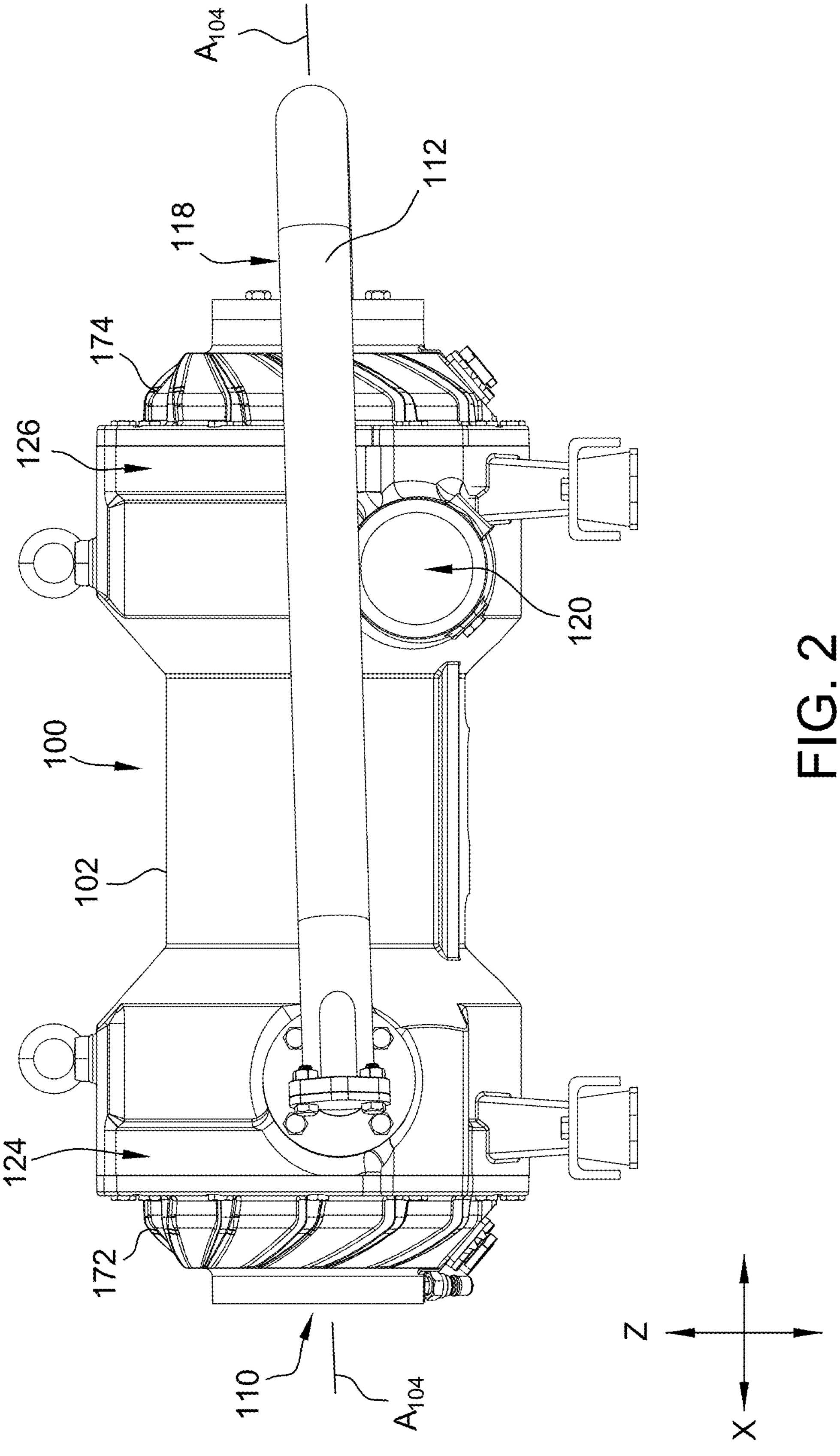
FIG. 2 is an elevation of the compressor shown in FIG. 1.

FIG. 1 is a perspective view of an example two-stage refrigerant compressor 100. The compressor 100 is operable to compress a working fluid (e.g., refrigerant), and includes a compressor housing 102 that forms at least one sealed cavity within which each stage of refrigerant compression is accomplished. The compressor 100 includes a first refrigerant inlet 110 (shown as covered by a plate in FIG. 1) to introduce refrigerant vapor into a first compression stage 124, a first refrigerant exit 114 (or a first discharge outlet port), a refrigerant transfer conduit 112 to transfer compressed refrigerant from the first compression stage 124 to the second compression stage 126, a second refrigerant inlet 118 to introduce refrigerant vapor into the second compression stage 126, and a second refrigerant exit 120 (or a second discharge outlet port). The first and second refrigerant exits 114, 120, or discharge outlet ports, are depicted as covered by a plate in FIG. 2. The first refrigerant inlet 110 is defined by a first end cap 172 connected to a main body 103 of the compressor housing 102. The first end cap 172 encloses the first compression stage 124. The second refrigerant inlet 118 is defined by a second end cap 174 connected to the main body 103 of the compressor housing 102. The second end cap 172 encloses the second compression stage 126.

The refrigerant transfer conduit 112 is operatively connected at opposite ends to the first refrigerant exit 114 and the second refrigerant inlet 118, respectively. The refrigerant transfer conduit 112 also includes a port 122 for controlling flow between the first and second compression stages 124, 126. The second refrigerant exit 120 delivers compressed refrigerant from a second compression stage 126 to a refrigeration system 200, shown in FIG. 3, in which compressor 100 is incorporated.

Figure 4:
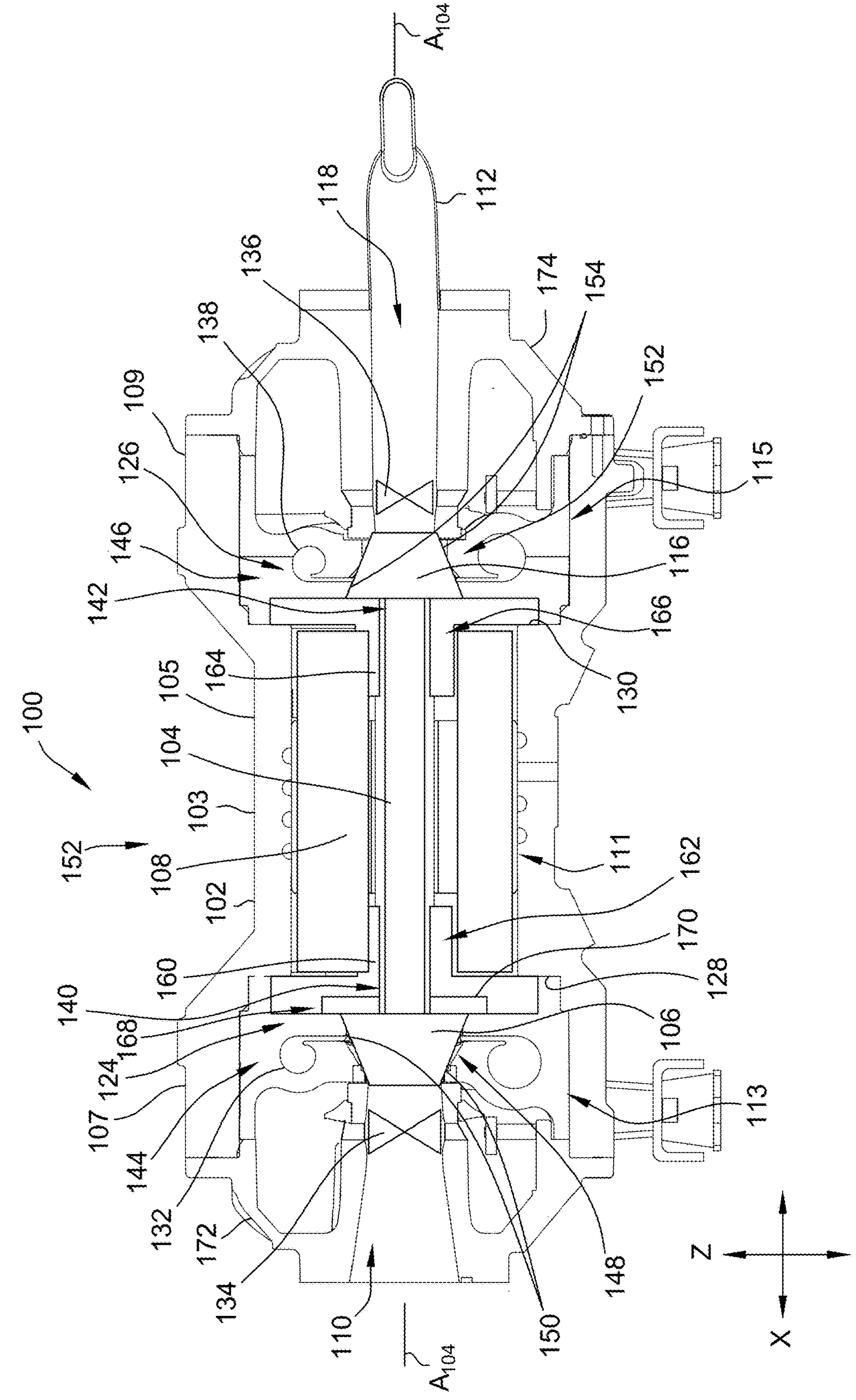
FIG. 4 is a section of the compressor taken along line 4-4 shown in FIG. 1.
Figure 5:
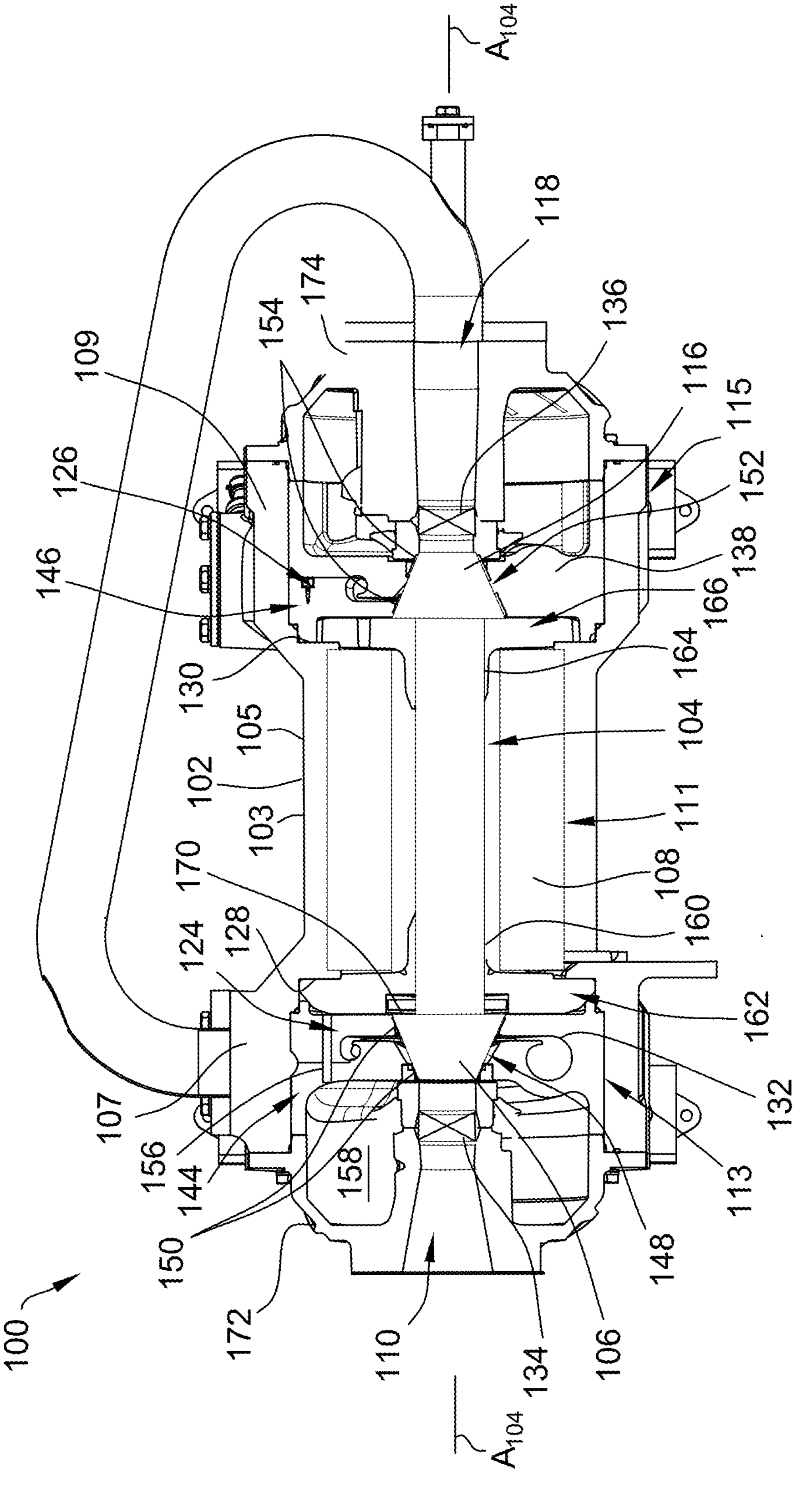
FIG. 5 is a section of the compressor taken along line 5-5 shown in FIG. 1.

Referring to FIGS. 4 and 5, the compressor housing 102 encloses the first compression stage 124 and the second compression stage 126 at opposite ends of the compressor 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e., compression) as the refrigerant velocity is slowed upon transfer to a sealed cavity 132 formed within a first volute assembly 144. The sealed cavity 132 includes a diffuser that is connected with an outlet of the impeller 106 and a volute that is connected with and located radially outward from the diffuser. The volute of the sealed cavity 132 is connected with the first refrigerant exit 114 to allow the compressed refrigerant to exit the first compression stage 124 into the refrigerant transfer conduit 112.

The first volute assembly 144 defines an impeller area 148 connected to the sealed cavity 132. The first impeller 106 is positioned in the impeller area 148 and operates to move the refrigerant entering via the first refrigerant inlet 110 in a radially outward direction into the diffuser of the sealed cavity 132. Mechanical seals 150 (e.g., labyrinth seals) are positioned between the first impeller 106 and the first volute assembly 144 to fluidly seal the impeller 106 in the impeller area 148. The seals 150 operate to limit or inhibit the refrigerant being moved by the impeller 106 into the sealed cavity 132 from leaking out from the impeller area 148.

The first compression stage 124 additionally includes a first variable inlet guide vane (VIGV) assembly 134 disposed upstream of the first impeller 106 in the first refrigerant inlet 110. The first VIGV assembly 134 includes a plurality of vanes whose position can be controlled to introduce pre-swirl into the gaseous refrigerant entering the first refrigerant inlet 110. Suitable variable inlet guide vane assemblies for use as the first VIGV assembly 134 are described in U.S. patent application Ser. No. 18/186,273, filed Mar. 20, 2023, the entire disclosure of which is incorporated by reference. Additionally, as described in U.S. patent application Ser. No. 18/186,273, the first VIGV assembly 134 in some examples of the compressor 100 is combined with the first end cap 172, such that the first end cap 172 defines a housing portion of the first VIGV assembly 134 for housing the plurality of vanes. In this way, the first end cap 172 and the first VIGV assembly 134 can be pre-assembled before being installed in the compressor 100.

Similarly, the second compression stage 126 includes a second impeller 116, configured to add kinetic energy to refrigerant transferred from the first compression stage 124 entering via the second refrigerant inlet 118. The kinetic energy imparted to the refrigerant by the second impeller 116 is converted to increased refrigerant pressure (i.e., compression) as the refrigerant velocity is slowed upon transfer to a sealed cavity 138 formed within a second volute assembly 146. The sealed cavity 138 includes a diffuser that is connected with an outlet of the impeller 116 and a volute that is connected with and located radially outward from the diffuser. The volute of the sealed cavity 138 is connected with the second refrigerant exit 120 to allow the compressed refrigerant to exit the second compression stage 126.

The second volute assembly 146 defines an impeller area 152 connected to the sealed cavity 138. The second impeller 116 is positioned in the impeller area 152 and operates to move the refrigerant entering via the second refrigerant inlet 118 in a radially outward direction into the diffuser of the sealed cavity 138. Mechanical seals 154 (e.g., labyrinth seals) are positioned between the second impeller 116 and the second volute assembly 148 to fluidly seal the impeller 116 in the impeller area 152. The seals 154 operate to limit or inhibit the refrigerant being moved by the impeller 116 into the sealed cavity 138 from leaking out from the impeller area 152.

The second compression stage 126 additionally includes a second variable inlet guide vane (VIGV) assembly 136 disposed upstream of the second impeller 116 in the second refrigerant inlet 118. The second VIGV assembly 136 includes a plurality of vanes whose position can be controlled to introduce pre-swirl into the gaseous refrigerant entering the second refrigerant inlet 118. Suitable variable inlet guide vane assemblies for use as the second VIGV assembly 136 are described in U.S. patent application Ser. No. 18/186,273, filed Mar. 20, 2023, the entire disclosure of which is incorporated by reference. Additionally, as described in U.S. patent application Ser. No. 18/186,273, the second VIGV assembly 136 in some examples of the compressor 100 is combined with the second end cap 174, such that the second end cap 174 defines a housing portion of the second VIGV assembly 136 for housing the plurality of vanes. In this way, the second end cap 174 and the second VIGV assembly 136 can be pre-assembled before being installed in the compressor 100.

The first impeller 106 and the second impeller 116 are connected at opposite ends of a shaft 104. The shaft 104 extends along a longitudinal axis $A_{104}$ of the compressor 100 between a first shaft end 140 and a second shaft end 142. The shaft 104 is operatively connected to a motor 108 positioned between the first impeller 106 and the second impeller 116, e.g., generally halfway between the first impeller 106 and the second impeller 116, such that the first impeller 106 and second impeller 116 are rotated at a rotation speed selected to compress the refrigerant to a pre-selected pressure exiting the second refrigerant exit 120. Any suitable motor may be incorporated into the compressor 100 including, but not limited to, an electrical motor.

The shaft 104 is rotatably supported by a first bearing assembly 160, associated with the first compression stage 124 and positioned within a first bearing housing 162, and a second bearing assembly 164, associated with the second compression stage 126 and positioned within a second bearing housing 166. Each of the first and second bearing housings 162, 166 includes a mounting structure (e.g., a flange) for connecting the respective bearing housings to the compressor housing 102. The first and second bearing assemblies 160 and 164 rotatably support the shaft 104 and are each located proximate one of the ends 140, 142 of the shaft 104, respectively. The motor 108 is positioned between the first and second bearing assemblies 160 and 164. The first bearing housing 162 is positioned between the motor 108 and the first volute assembly 144. The second bearing housing 166 is positioned between the motor 108 and the second volute assembly 146. In the example compressor 100, the first bearing assembly 160 and the second bearing assembly 164 each include radial bearings.

In some embodiments, the first bearing assembly 160 and/or the second bearing assembly 164 include a foil bearing assembly. For example, radial foil bearing assemblies include compliant foil elements that surround and support the shaft 104 on a film of fluid (e.g., gas or air). The fluid film is formed between the shaft 104 and the foil elements when the rotation speed of the shaft 104 exceeds a "liftoff" speed. Suitable foil bearing assemblies are described in U.S. patent application Ser. No. 18/617,018, filed Mar. 26, 2024, U.S. patent application Ser. No. 18/162,396, filed Jan. 31, 2023, issued as U.S. Pat. No. 11,852,153 on Dec. 26, 2023, U.S. patent application Ser. No. 17/167,611, filed Feb. 4, 2021, issued as U.S. Pat. No. 11,686,341 on Jun. 27, 2023, U.S. patent application Ser. No. 16/809,836, filed Mar. 5, 2020, issued as U.S. Pat. No. 11,306,726 on Apr. 19, 2022, and U.S. patent application Ser. No. 16/783,369, filed Feb. 6, 2020, issued as U.S. Pat. No. 11,391,291 on Jul. 19, 2022, the disclosures of which are incorporated by reference in their entirety.

The compressor 100 also includes a thrust bearing assembly 168 positioned between the first impeller 106 and the first bearing assembly 160. The thrust bearing assembly 168 includes a thrust disk 170 that supports axial forces imparted to the shaft 104 during operation of the compressor 100 (e.g., from thrust forces generated by the first stage impeller 106). The thrust bearing assembly 168 includes any suitable bearing type, including for example and without limitation, roller-type bearings, fluid film bearings, foil bearings, and combinations thereof. An example thrust bearing assembly is described in U.S. patent application Ser. No. 16/946,173, filed Jun. 9, 2020, issued as U.S. Pat. No. 11,560,900 on Jan. 24, 2023, the entire disclosure of which is incorporated by reference. In some examples, the thrust bearing assembly 168 includes foil bearings on one or both sides of the thrust disk 170.

Figure 3:
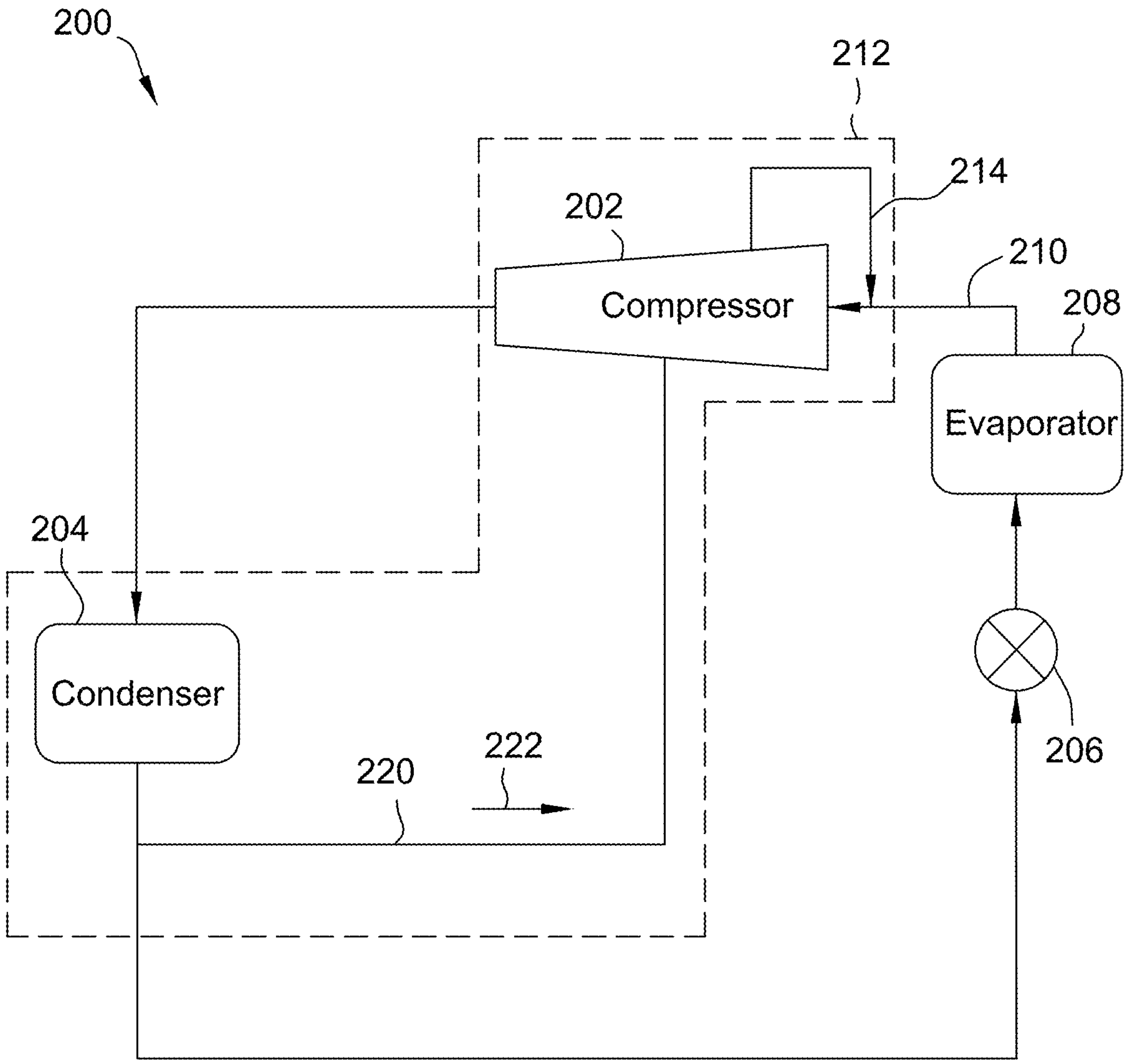
FIG. 3 is a schematic of an example refrigeration system suitable for use with the compressor shown in FIG. 1.

FIG. 3 is a schematic diagram of an example refrigeration system 200 in which the compressor of FIG. 1 can be implemented. The refrigeration system 200 includes a compressor 202, e.g., compressor 100, a condenser 204, an expansion device 206 (e.g., an expansion valve, orifice, capillary tube), and an evaporator 208. The refrigeration system 200 may include additional components or other components than those shown and described with reference to FIG. 3.

In operation, the compressor 202 receives a working fluid, such as a refrigerant, as a low pressure gas through a suction line 210. The compressor 202 compresses the low pressure refrigerant gas, thereby raising the temperature and pressure of the refrigerant. The compressed, high temperature refrigerant exiting the compressor 202 is channeled towards and passes through the condenser 204, where the refrigerant is condensed to a high pressure liquid or a high pressure liquid-gas mixture. The compressed, condensed refrigerant exiting the condenser 204 is channeled towards and passes through the expansion device 206 that expands the refrigerant, thereby reducing the pressure of the refrigerant. The expanded (or "uncompressed") refrigerant exiting the expansion device 206 may be a gas or a mixture of gas and liquid after passing through the expansion device 206. The uncompressed refrigerant exiting the expansion device 206 is channeled towards and passes through the evaporator 208. The uncompressed refrigerant fluid evaporates to a gas in the evaporator 208. The uncompressed refrigerant gas exiting the evaporator 208 is channeled back towards the compressor 202 via the suction line 210, where the working fluid is again compressed and the process repeats.

The example refrigeration system 200 includes a compressor cooling system 212 that draws working fluid (e.g., refrigerant) from part of the main refrigeration circuit (i.e., the refrigeration loop in which the working fluid is compressed using the compressor 202, condensed using the condenser 204, expanded using the expansion device 206, and evaporated using the evaporator 208). The working fluid used in the compressor cooling system 212 is diverted from the main refrigeration circuit and channeled through a coolant supply line 220 towards the compressor 202 to cool components of the compressor 202, such as a motor and bearings of the compressor 202. The working fluid used in the compressor cooling system 212 may also be referred to herein as "coolant" or coolant 222. The coolant 222 cools the components of the compressor 202 through one or more cooling channels in the housing of the compressor 202 (e.g., the compressor housing 102 of the compressor 100) as described, for example, in U.S. patent application Ser. No. 17/248,166, filed Jan. 12, 2021, published as U.S. Publication No. 2022/0220976 on Jul. 14, 2022, and U.S. patent application Ser. No. 18/186,386, filed Mar. 20, 2023, the disclosures of which are incorporated by reference in their entirety.

The coolant is returned to the refrigeration circuit by a coolant return line 214 that channels the coolant towards a low pressure line 220 of the compressor 202 or refrigerant circuit (e.g., suction line 210). As used herein, "low pressure line" of a compressor (e.g., the compressor 202) refers to a refrigerant flow channel within the compressor or the main refrigeration circuit of which the compressor 202 is a part that precedes and channels refrigerant towards one or more impellers in the compression stages of the compressor (e.g., a first stage impeller of the compressor). The low pressure line 220 of the compressor 202 may include, for example and without limitation, a passage extending between an inlet of a first stage of the compressor 202 and a first stage impeller, the first stage inlet of the compressor 202, and the suction line 210 connected to the first stage inlet of the compressor 202.

The coolant return line 214 may be an internal fluid passage formed within the housing of the compressor 202. In the example compressor 100, as shown in FIG. 5, an internal fluid passage 156 is formed in the compressor housing 102 and returns coolant from within the compressor housing 102, after cooling the motor 108 and/or one or more of the bearing assemblies 160, 164, 168, to a damping chamber 158 defined by the first end cap 172. The coolant is then returned from the damping chamber 158 to a suction line or passage upstream from the impeller 106 (e.g., between the first refrigerant inlet 110 and the impeller 106), as is described in U.S. patent application Ser. No. 18/186,386, filed Mar. 20, 2023, which is incorporated by reference in its entirety.

The coolant used in the cooling system 212 is suitably drawn from a low temperature, high pressure side of the main refrigeration circuit downstream from the condenser 204 and upstream from the expansion device 206 (i.e., from a refrigerant line connected between the condenser 204 and the expansion device 206), or, alternatively, from the condenser 204. The pressure differential across the cooling system 212, i.e., the pressure differential between the high pressure refrigerant exiting the condenser 204 and the low pressure refrigerant entering the compressor 202 via the suction line 210, facilitates driving the coolant through the compressor 202, and back into the refrigeration circuit. The relatively low temperature refrigerant exiting the condenser 204, compared to a temperature of the refrigerant at downstream stages of the main refrigeration circuit (e.g., exiting the evaporator 208 and/or the expansion device 206), facilitates increasing the cooling capacity of the cooling system 212.

Referring to FIGS. 4 and 5, the compressor housing 102 of the compressor 100 includes two datum surfaces 128, 130, also referred to as a first datum 128 and a second datum 130, for locating components of the compressor 100 in the compressor housing 102 and facilitating axial alignment between the components relative to the longitudinal axis $A_{104}$. In the example compressor 100, the first datum 128 is used to locate the first bearing housing 162 and the first volute assembly 144 in the compressor housing 102, and the second datum 130 is used to locate the second bearing housing 166 and the second volute assembly 146 in the compressor housing 102. In the example compressor 100, the first datum 128 is an axial surface that faces the first compression stage 124, and each of the first bearing housing 162 and the first volute assembly 144 abuts the first datum 128. Additionally, in the example compressor 100, the second datum 130 is an axial surface that faces the second compression stage 126, and each of the second bearing housing 166 and the second volute assembly 146 abuts the second datum 130.

Advantageously, abutting the first datum 128 with each of the first bearing housing 162 and the first volute assembly 144 reduces complexity in positioning and aligning these components in the compressor housing 102, and limits or eliminates tolerance stack between the first bearing housing 162 and the first volute assembly 144. For example, each of the first bearing housing 162 and the first volute assembly 144 can be secured (e.g., bolted) to the first datum 128, which eliminates the need to directly connect (e.g., fasten) the first volute assembly 144 to the first bearing housing 162 and thus reduces the scope of machining required at the interface between the first volute assembly 144 and the first bearing housing 162 (e.g., by eliminating the need to machine aligning pairs of fastener holes in the first bearing housing 162 and the first volute assembly 144). Abutting the second datum 130 with each of the second bearing housing 166 and the second volute assembly 146 likewise reduces complexity in positioning and aligning these components in the compressor housing 102 and limits or eliminates tolerance stack between the second bearing housing 166 and the second volute assembly 146. For example, each of the second bearing housing 166 and the second volute assembly 146 can be secured (e.g., bolted) to the second datum 130, which eliminates the need to directly connect (e.g., fasten) the second volute assembly 146 to the second bearing housing 166 and thus reduces the scope of machining required at the interface between the second volute assembly 146 and the second bearing housing 166 (e.g., by eliminating the need to machine aligning pairs of fastener holes in the second bearing housing 166 and the second volute assembly 146). As a result, the assembly process of the compressor 100 is greatly simplified and easily repeatable with reduced tolerance stack. The lower tolerance stack allows better control over the axial alignment of components of the compressor 100 that support rotation of the shaft, such as the bearing assemblies 160, 164, 168, as well as fluid seals in the compressor housing 102, such as the mechanical seals 150, 154 that control (e.g., inhibit or limit) refrigerant from leaking from the impeller areas 148, 152.

Figure 30:
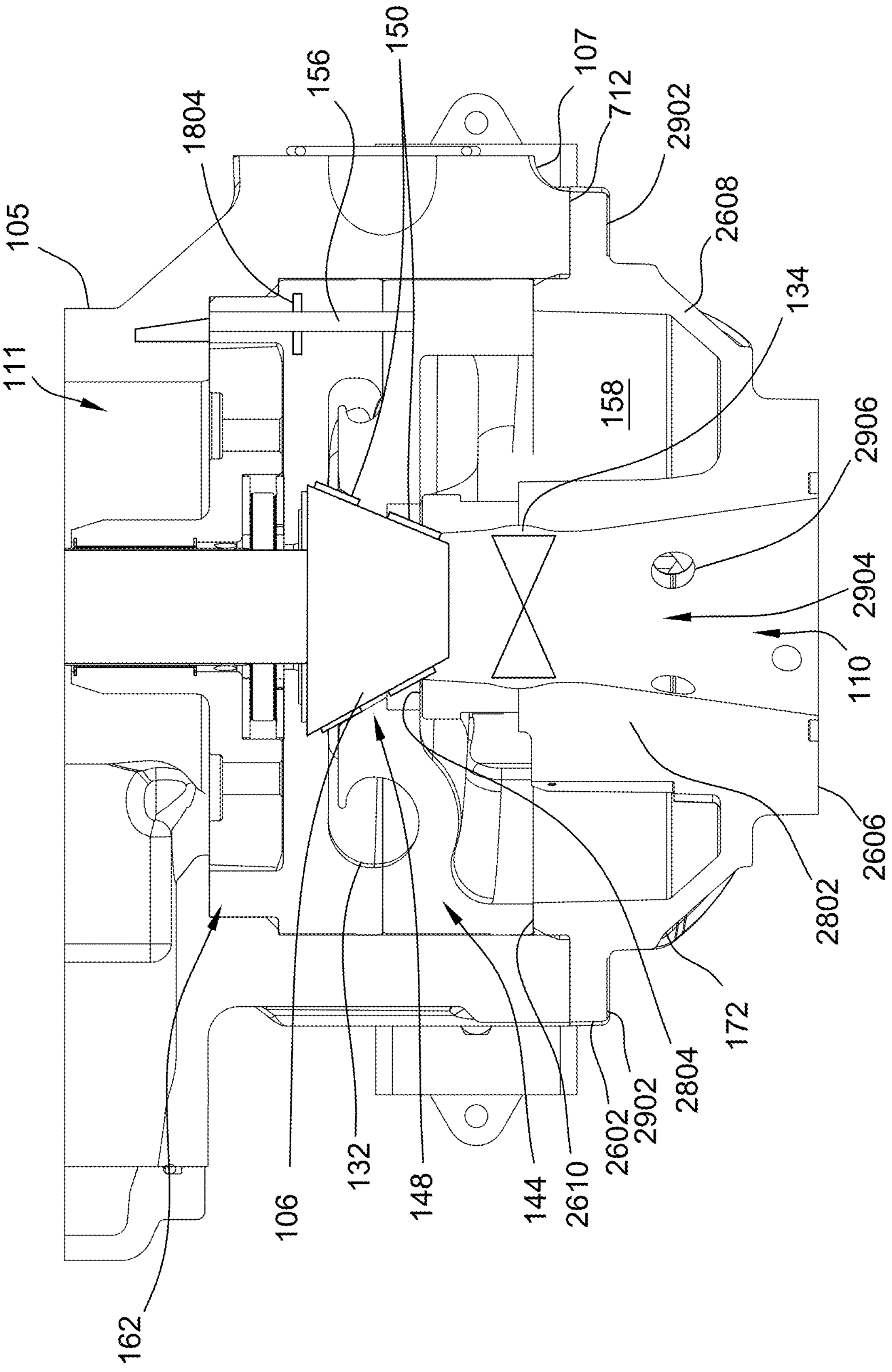
Figure 31:
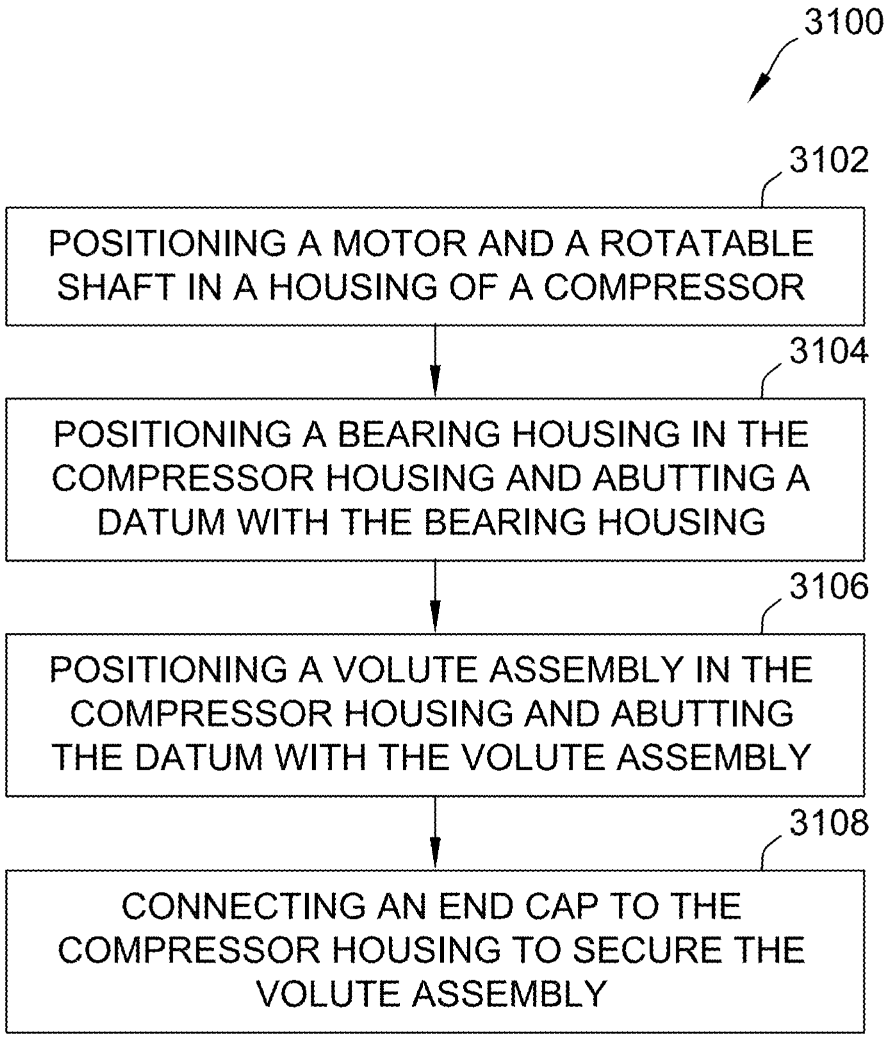
FIG. 31 is a flow diagram of a method of assembling the compressor shown in FIG. 1, in accordance with FIGS. 6-30.

A flow diagram of a method 3100 of assembling the compressor 100 is shown in FIG. 31. The method 3100 will be described with additional reference to FIGS. 6-30. In this description, assembly of the compressor 100 will be described for components of one stage of the compressor 100, e.g., for components of the first compression stage 124. Description of the assembly of components of the first compression stage 124 of the compressor 100 applies to the assembly of components of the second compression stage 126 of the compressor 100 unless expressly stated otherwise or the context clearly indicates otherwise. For example, for each compression stage 124, 126, the assembly method includes positioning one of the bearing housings 162, 166 and one of the volute assemblies 144, 146 in the compressor housing 102, and securing the respective volute assembly 144, 146 in the compressor housing 102 with an end cap 172, 174. In the example compressor 100, the thrust bearing assembly 168 is assembled as part of the first compression stage 124 but a thrust bearing assembly is not included in the second compression stage 126 and thus is not part of the assembly method for the second compression stage. In some examples, the thrust bearing assembly 168 is included in both stages 124, 126.

Figure 6:
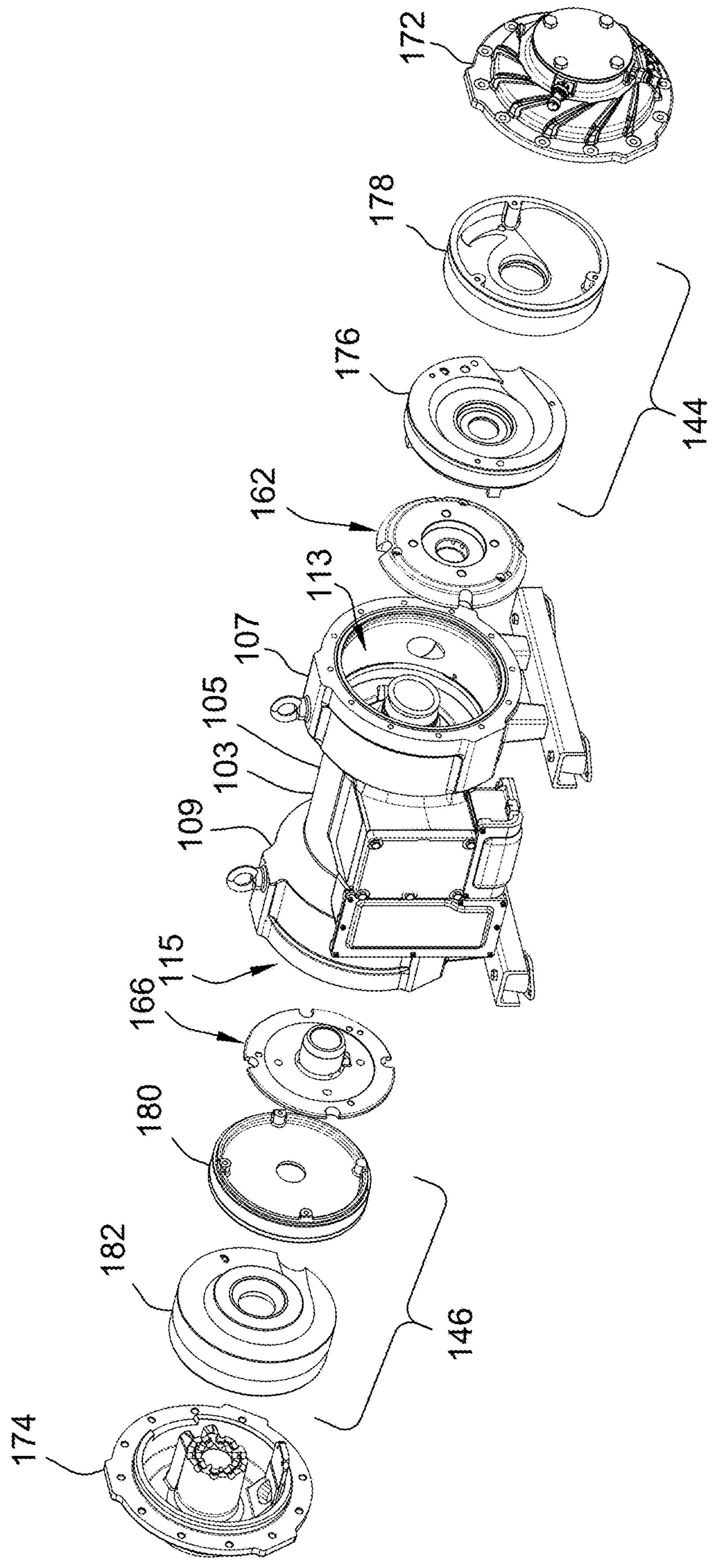
FIG. 6 is an exploded view of the compressor with various components omitted.

The method 3100 includes positioning 3102 the motor 108 and the rotatable shaft 104 in the compressor housing 102. The compressor housing 102 includes the main body 103 which, as shown in FIGS. 4-6, defines a central motor section 105 and two end sections 107, 109 on opposite ends of the motor section 105. The motor section 105 defines a motor area 111 within which the motor 108 and the shaft 104 are positioned 3102. The end sections 107, 109 respectively define sockets 113, 115 that form the compression stages 124, 126, respectively. The first datum 128 is an axial surface that faces a first socket 113 and surrounds an opening between the motor area 111 and the first socket 113. The second datum 130 is an axial surface that faces a second socket 115 and surrounds an opening between the motor area 111 and the second socket 115. The shaft 104 extends in the motor area 111 between the first and second sockets 113, 115. The first end 140 of the shaft 104 extends slightly beyond the first datum 128 and into the first socket 113, and the second end 142 of the shaft 104 extends slightly beyond the second datum 130 and into the second socket 115. Alternatively, the first end 140 of the shaft 104 may be flush with or terminate slightly prior to the first datum 128, and/or the second end 142 of the shaft 104 may be flush with or terminate slightly prior to the second datum 130.

Figure 7:
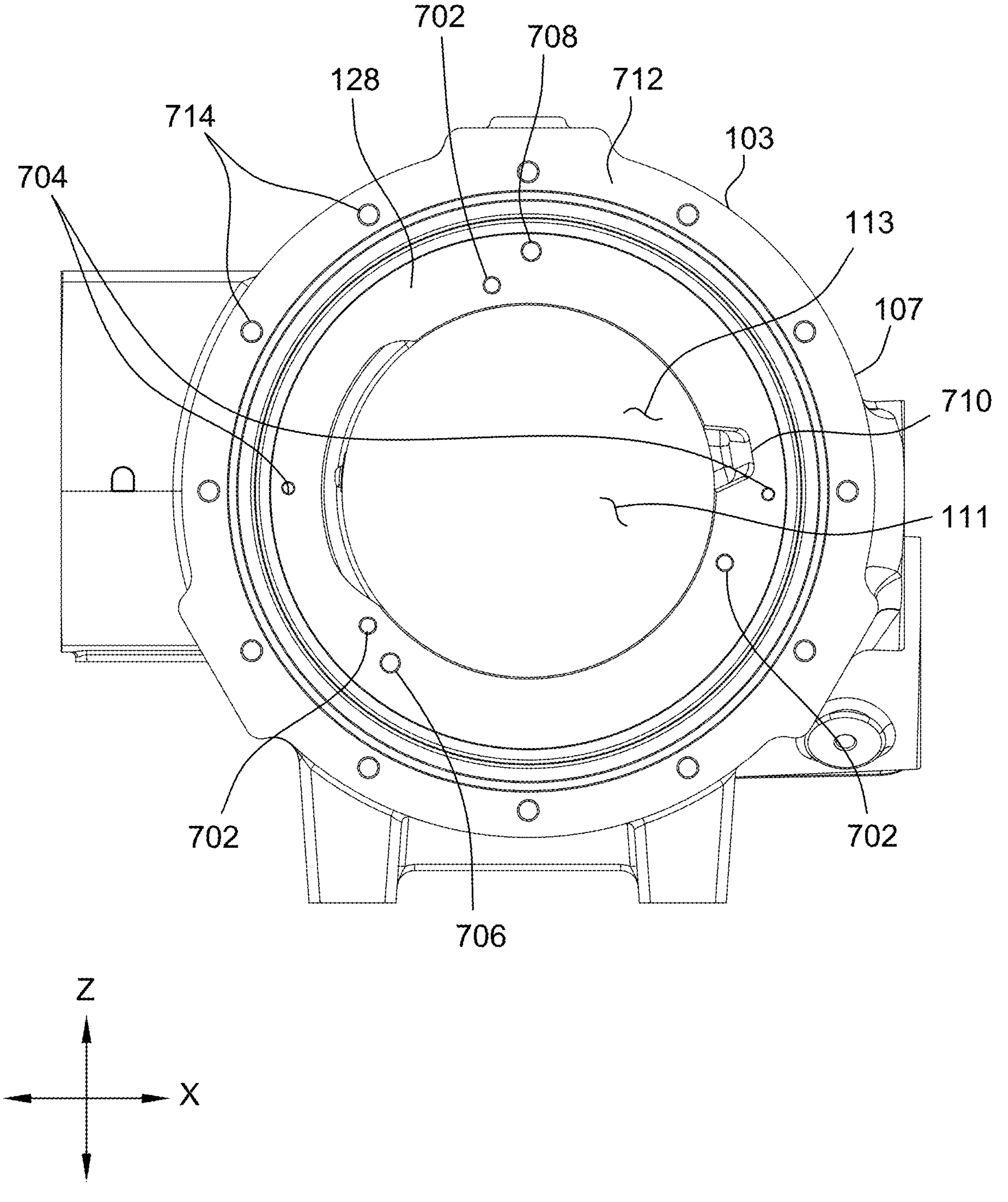
FIG. 7 is an elevation of the compressor shown in FIG. 1 viewed along a longitudinal axis.
Figure 9:
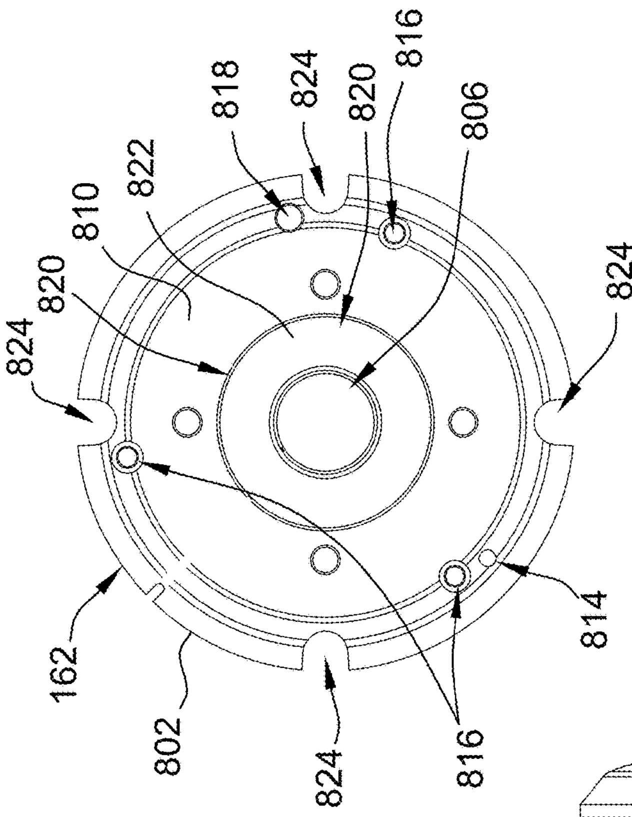
FIGS. 8-10 are isolated views of a bearing housing of the compressor shown in FIG. 1.
Figure 10:
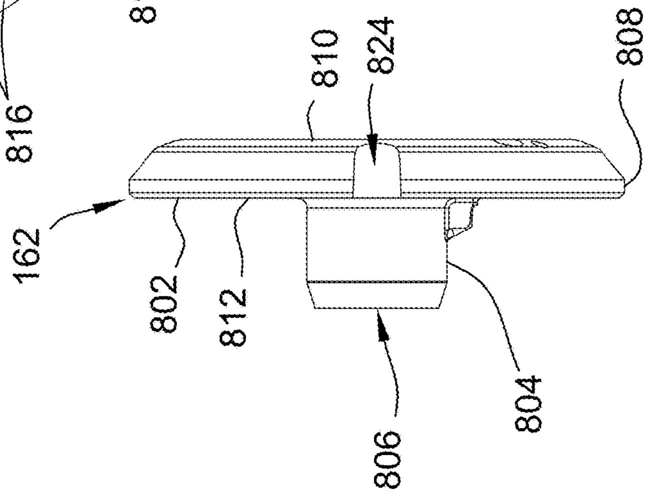
Figure 8:
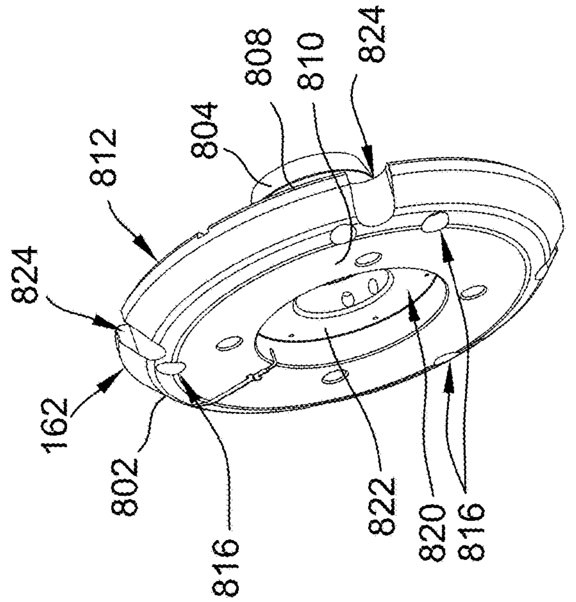

The first datum 128 is shown in FIG. 7, which is an isolated elevation of the main body 103 of the compressor housing 102, viewed along the longitudinal axis $A_{104}$ and facing the end section 107 that defines the first socket 113. Description and illustration of the first datum 128 applies to the second datum 130 unless expressly stated otherwise or the context clearly indicates otherwise. The datum 128 includes the axial surface with two sets of fastener apertures 702, 704 (e.g., bores or blind holes) defined therein. As described below, a first set of fastener apertures 702 are used to attach or fasten (e.g., bolt) the bearing housing 162 to the datum 128, and a second set of fastener apertures 704 are used to attach or fasten (e.g., bolt) the volute assembly 144 to the datum 128. The datum 128 also includes a first alignment aperture 706 and a second alignment aperture 708 defined in the axial surface. The first alignment aperture 706 is used to angularly align the bearing housing 162 relative to the main body 103, and the second alignment aperture 708 is used to angularly align the volute assembly 144 relative to the main body 103 and the bearing housing 162 as described below. The datum 128 also includes a notch or recess 710 in the axial surface, which connects to the motor area 111 and forms an entry for the internal fluid passage 156 formed in the compressor housing 102 by the bearing housing 162 and the volute assembly 144 as described below.

The method 3100 also includes positioning 3104 the first bearing housing 162 in the compressor housing 102. The first bearing housing 162 is shown isolated in FIGS. 8-10. Illustration and description of the first bearing housing 162 applies to the second bearing housing 166 unless expressly stated otherwise or the context clearly indicates otherwise. In the example compressor 100, the second bearing housing 166 has similar elements and components as the first bearing housing 162.

The bearing housing 162 includes a disk-shaped flange 802, also referred to as a disk or plate, that is joined to a cylindrical bearing sleeve 804. The bearing sleeve 804 extends axially from the flange 802 and defines a center bore 806 of the bearing housing 162. The center bore 806 receives the shaft 104 and houses the bearing assembly 160 (e.g., a radial bearing). The flange 802 extends radially outward relative to the sleeve 804 to a radial edge 808 and defines two opposing axial surfaces 810, 812 joined by the radial edge 808.

The flange 802 of the bearing housing 162 includes an alignment hole 814 and a set of fastener holes 816 extending through the axial surfaces 810, 812. The alignment hole 814 corresponds to the alignment aperture 706 defined in the axial surface of the datum 128. An alignment member 1302 (see FIG. 13), such as a pin or dowel, is inserted through the alignment hole 814 and the corresponding alignment aperture 706 to angularly align the bearing housing 162 relative to the main body 103 of the compressor housing 102. Each one of fastener holes 816 corresponds to one of the fastener apertures 702 defined in the axial surface of the datum 128. A fastener 1304 (see FIG. 13), such as a bolt, is inserted through each pair of a fastener hole 816 and an aperture 702 to attach (e.g., bolt) the bearing housing 162 to the main body 103 of the compressor housing 102, and more particularly, to the datum 128.

The flange 802 also includes a first coolant hole 818 that cooperatively forms the internal fluid passage 156 with the volute assembly 144, described below. The first coolant hole 818 also enables angularly aligning the volute assembly 144 relative to the bearing housing 162, described below. The first coolant hole 818 is connected to the motor area 111 via the notch 710 in the axial surface of the datum 128 when the bearing housing 162 is positioned 3104 in the compressor housing 102.

The flange 802 also includes an annular recess 820 defined in the axial surface 810 that is sized and shaped to at least partially receive the thrust disk 170 therein. The annular recess 820 defines a recessed surface 822 in the axial surface 810. The recessed surface 822 may operate as a thrust surface with the thrust disk 170 during operation of the compressor 100.

The flange 802 also includes one or more slots 824 defined therein and extending between the axial surfaces 810, 812. The slots 824 enable the volute assembly 144 to pass through the bearing housing 162 and abut the datum 128, described below. The slots 824 are each U-shaped and are formed at the peripheral edge 808 of the flange 802. The slots 824 are arranged circumferentially about the flange 802. In the example flange 802, there are four slots 824 and each slot 824 is spaced approximately 90° from each adjacent slot 824. Any suitable number of slots 824 may be included to enable the volute assembly 144 to abut the datum 128, and the circumferential spacing of the slots 824 may vary depending on the number of slots 824. The slots 824 may also have any suitable size, shape, position, and arrangement on the flange 802.

Figure 11:
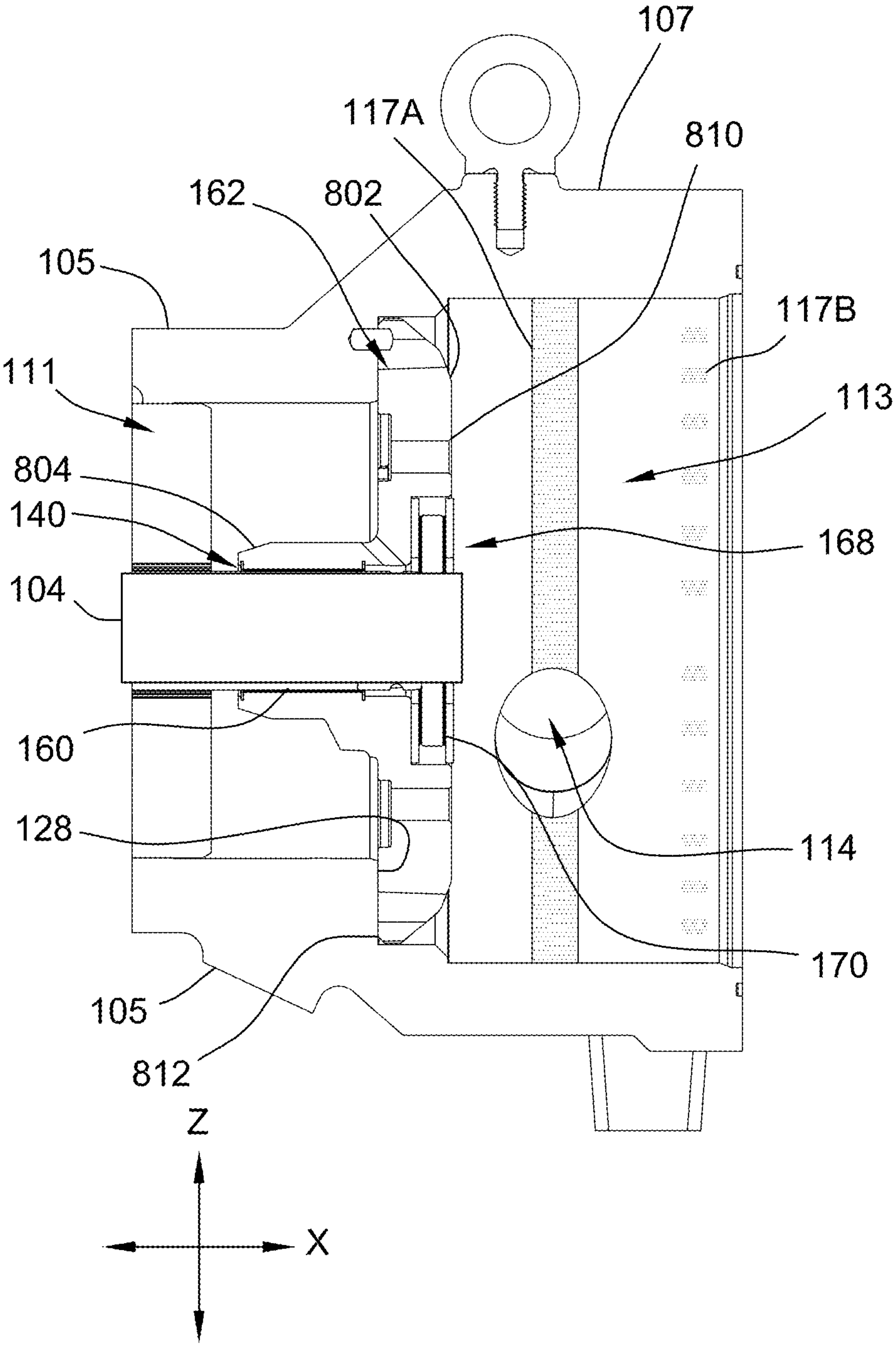
FIGS. 11-13 depict a stage of assembling the compressor shown in FIG. 1, in which the bearing housing of FIGS. 8-10 is positioned in a compressor housing.
Figure 12:
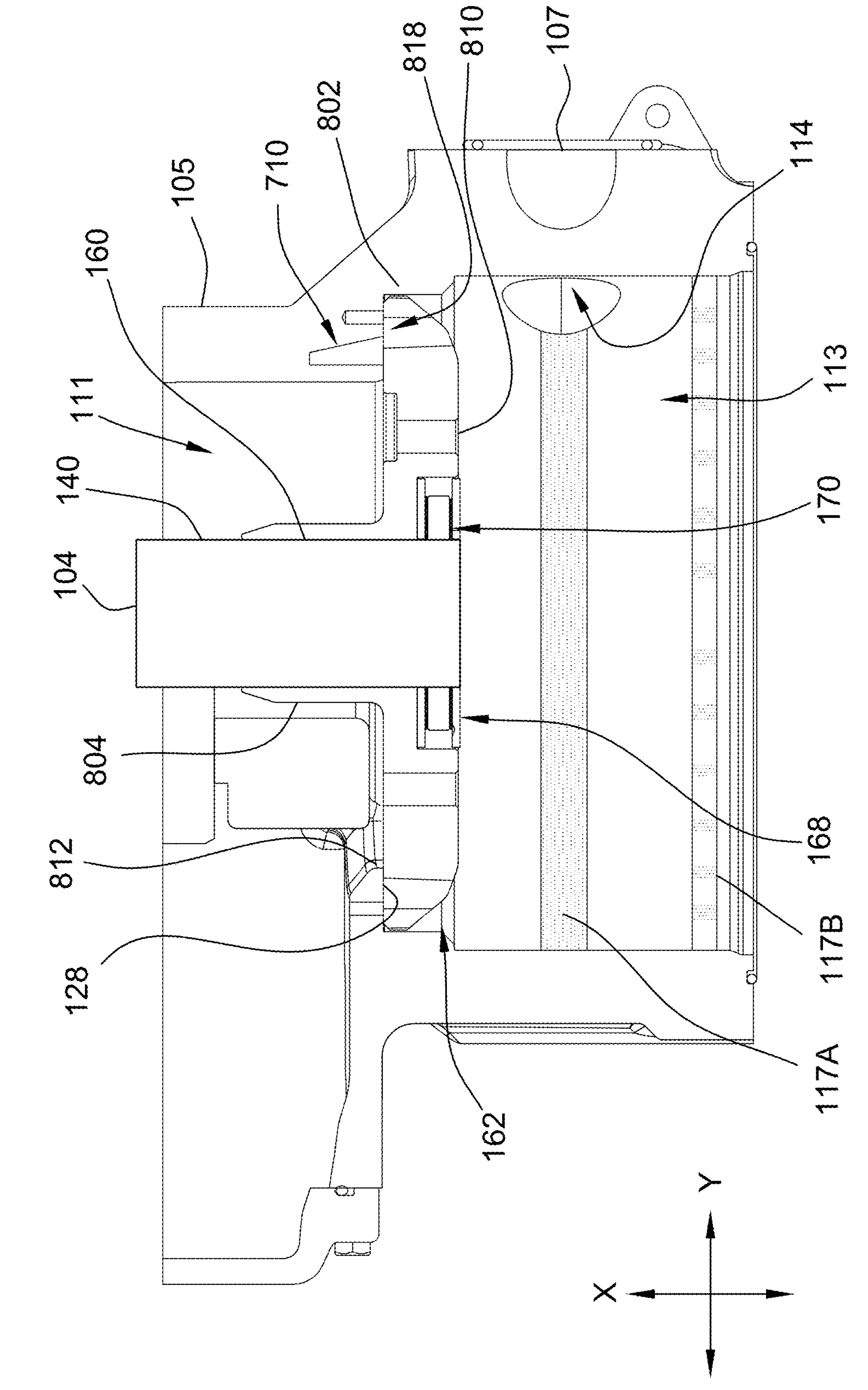
Figure 13:
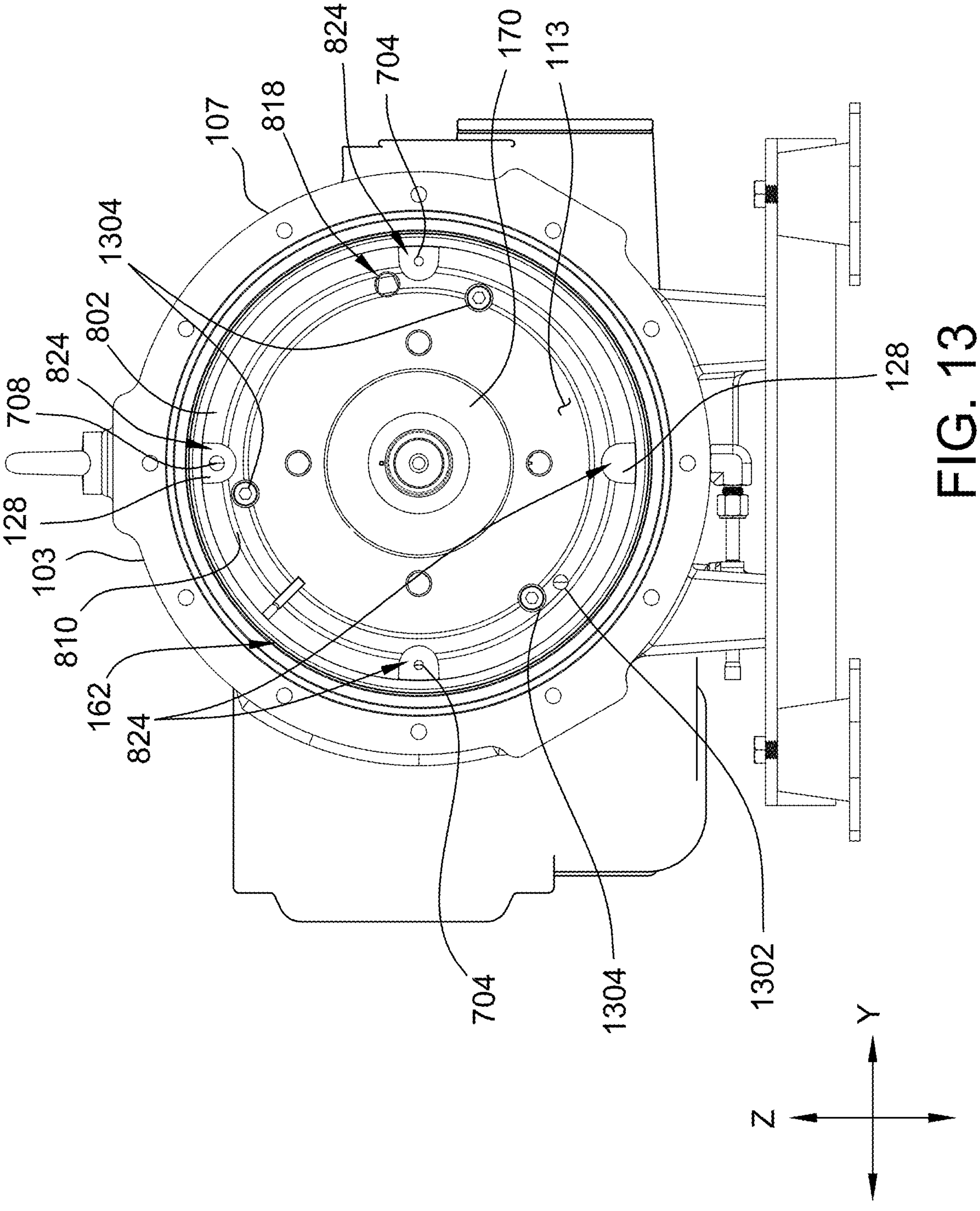

FIGS. 11-13 depict the bearing housing 162 positioned 3104 in the main body 103 of the compressor housing 102. A first, or front, axial surface 810 of the flange 802 faces the socket 113 of the main body 103 of the compressor housing 102. A second, or back, axial surface 812 of the flange 802 faces the motor area 111. The flange 802 partitions or separates, partially or entirely, the motor area 111 and the socket 113. The bearing sleeve 804 extends axially along the longitudinal axis $A_{104}$ (see FIGS. 4 and 5) into the motor area 111 and the shaft 104 is received in the center bore 806. The bearing assembly 160 is housed in the bearing sleeve 804 and surrounds the shaft 104 proximate the first shaft end 140. The second axial surface 812 abuts the datum 128, which locates the bearing housing 162 in the compressor housing 102. In particular, the datum 128 operates as a reference surface for axially positioning and aligning the bearing assembly 160 relative to the shaft 104.

In the example compressor 100, the compressor housing 102 includes one or more fit bands 117 to position and align the compressor components within the compressor housing 102. In some embodiments, each compressor 100 may include a first fit band 117-A at the interface between the compressor housing 102 and the bearing housing 162 and a second fit band 117-B at the interface between the compressor housing 102 and the volute assembly 144. The fit band of this embodiment is positioned at the interface between a compressor component and the compressor housing 102 to align the compressor components. Conventionally, the entire interior surface of the compressor housing 102 is machined to achieve precise radial alignment across the entire interior surface. In contrast, the fit band 117 allows for a line-to-line slip fit to radially align the compressor components.

The fit band 117 may be positioned on the volute assembly 144 and/or the bearing housing 162, as shown in FIGS. 11-12. For example, a first fit band 117-A radially aligns the bearing housing 162 to the centerline of the compressor housing 102. Additionally, a second fit band 117-B radially aligns the volute assembly 144 and the centerline of the compressor housing 102. The fit band 117 includes raised portions on the interior portion of the compressor housing 102 that interface with corresponding compressor components. The raised portions of the fit band 117 may be formed by undercuts. The raised portion of the fit band 117 are suitably be modified to provide the desired alignment between the compressor housing 102 and the compressor components. Aligning the volute assembly 144 and/or the bearing housing 162 with the fit bands reduces the amount of machining required to control the radial alignment of the compressor. For example, the fit band enables a line-to-line slip fit along the raised portions of the fit band 117 that radially position the compressor components to the centerline of the compressor housing 102.

When the bearing housing 162 is positioned 3104 in the main body 103, the bearing housing 162 is attached (e.g., bolted) to the main body 103 of the compressor housing 102 and, more particularly, to the datum 128 using the fasteners 1304 (e.g., bolts) that are inserted through each pair of a fastener hole 816 in the flange 802 and an aperture 702 in the datum 128. The alignment member 1302 is also inserted through the alignment hole 814 of the bearing housing 162 (see FIG. 9) and the corresponding alignment aperture 706 of the datum 128 (see FIG. 7) to angularly align the bearing housing 162 relative to the datum 128. Angularly aligning the bearing housing 162 relative to the datum 128 achieves several objectives. For example, angular alignment of the bearing housing 162 relative to the datum 128 ensures that first coolant hole 818 is aligned with the notch 710 and connected to the motor area 111 via the notch 710. Additionally, as shown in FIG. 13, angular alignment of the bearing housing 162 relative to the datum 128 ensures that the slots 824 allow access to the datum 128, the second set of fastener apertures 704, and the second alignment aperture 708 defined in the axial surface of the datum 128. As described below, angular alignment of the slots 824 relative to the datum 128 enables the datum 128 to operate as a reference surface for axially positioning and aligning the volute assembly 144 in the compressor housing 102. Further, a fit band 117 may radially position the bearing housing 162 to the centerline of the compressor housing 102. For example, a first fit band 117-A is located between the bearing housing 162 and the compressor housing 102 provides an interface to position the bearing housing 162 to axially align with centerline of the compressor housing 102.

In the example compressor 100, the thrust bearing assembly 168 is positioned on the shaft 104 after the bearing housing 162 is positioned 3104 in the main body 103 of the compressor housing 102. The thrust bearing assembly 168 is positioned on the shaft 104 proximate the first shaft end 140 and the thrust disk 170 is received in the annular recess 820 defined in the axial surface 810 of the flange 802. The thrust bearing assembly 168 may be mounted on the shaft 104 as described in U.S. Pat. No. 11,560,900, which is incorporated by reference in its entirety.

Figure 17:
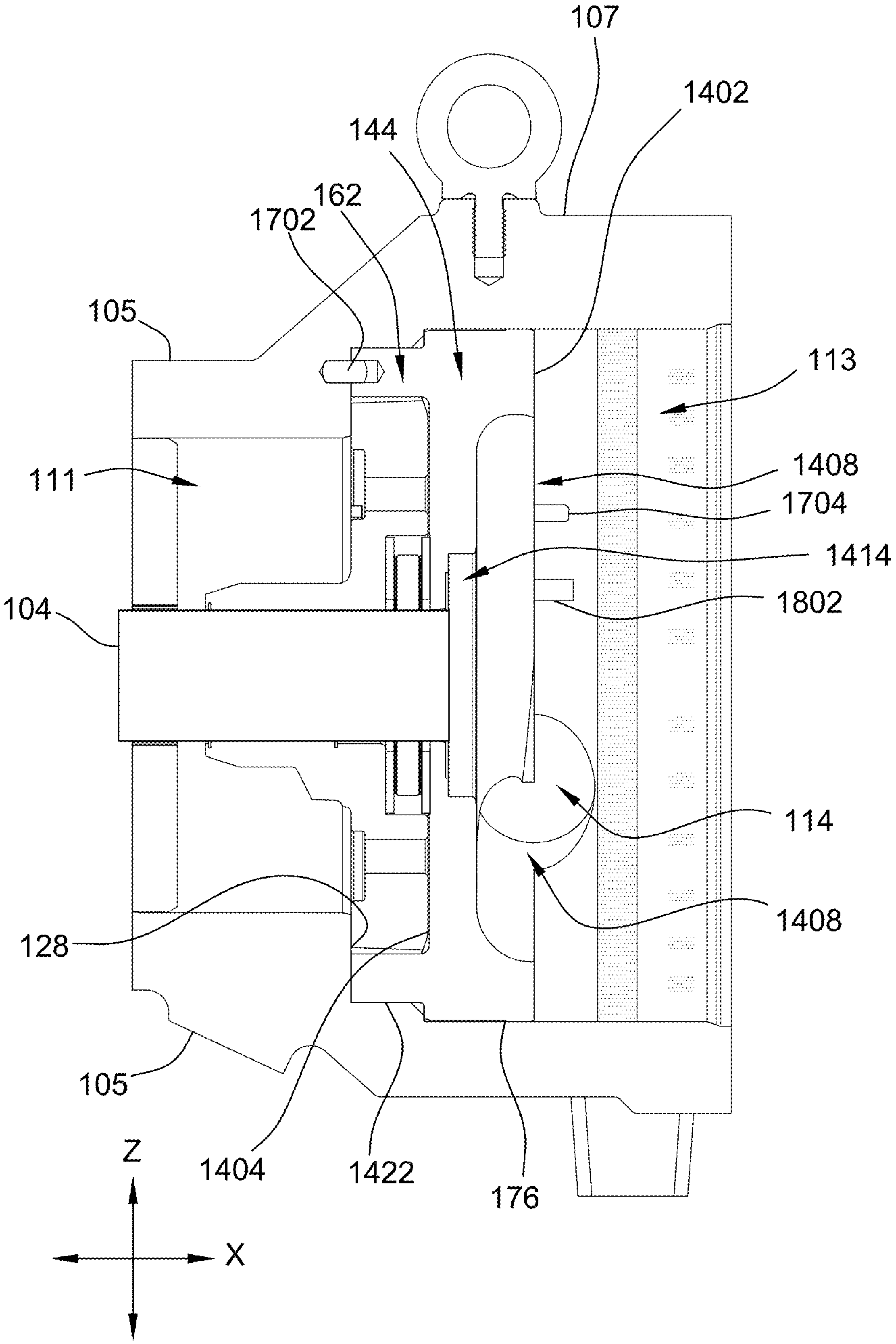
FIGS. 17-19 depict a stage of assembling the compressor shown in FIG. 1, in which the volute plate of FIGS. 14-16 is positioned in the compressor housing adjacent the bearing housing of FIGS. 8-13.
Figure 18:
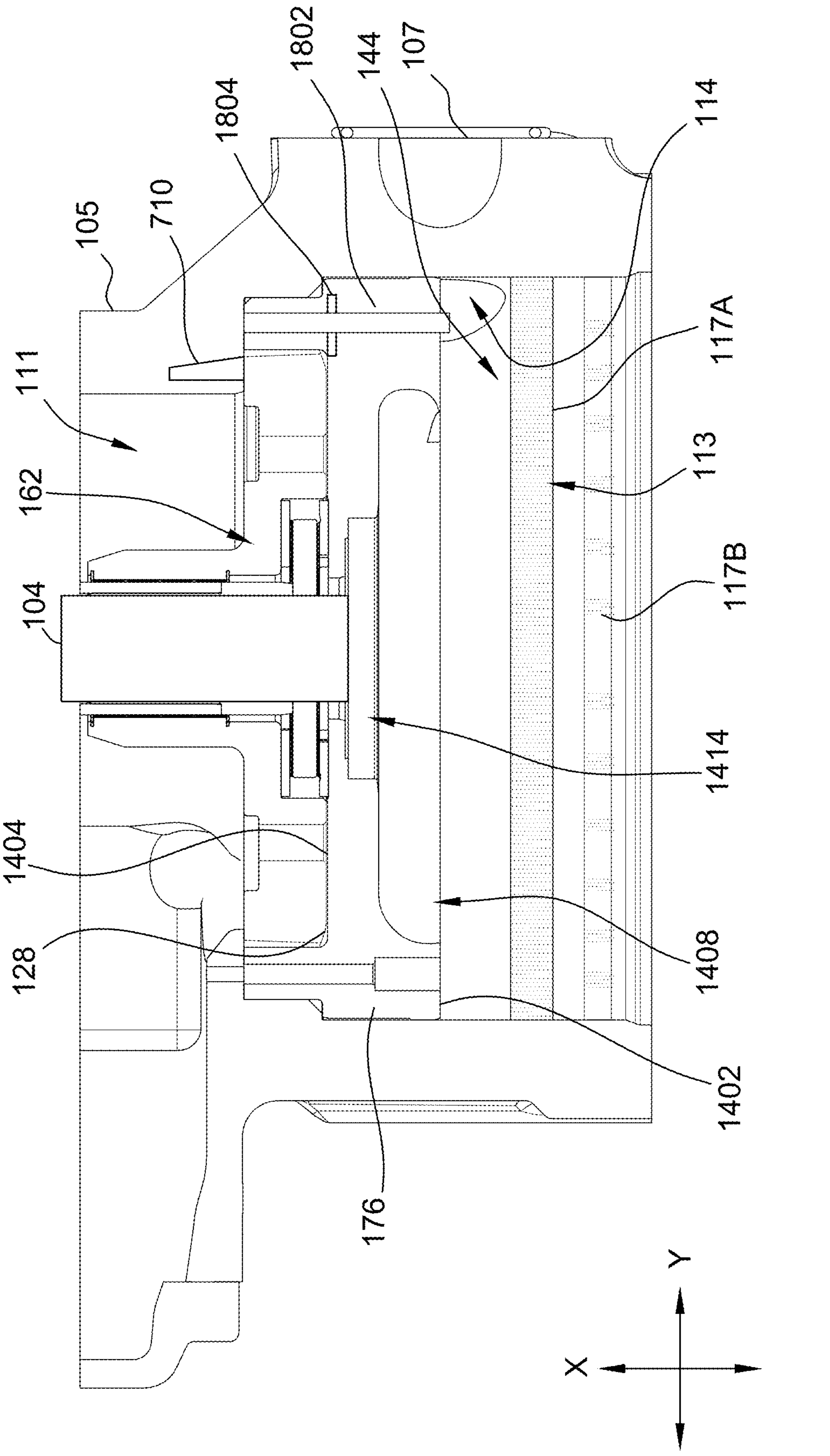
Figure 19:
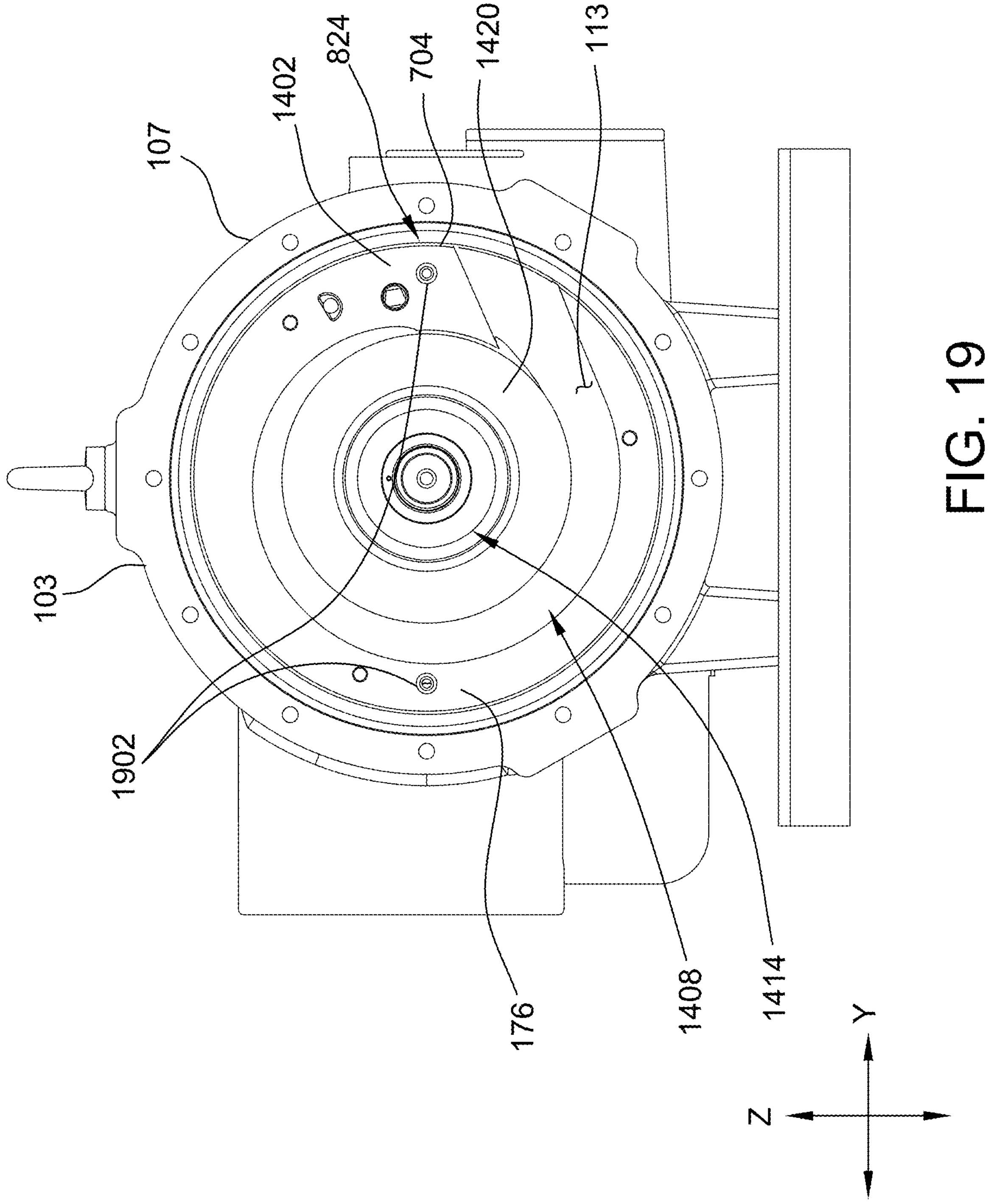
Figure 22:
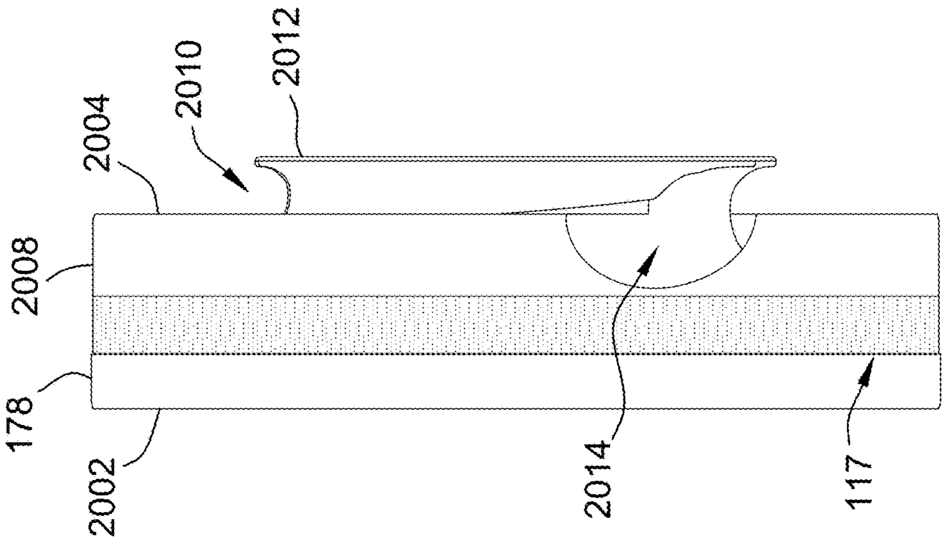
Figure 23:
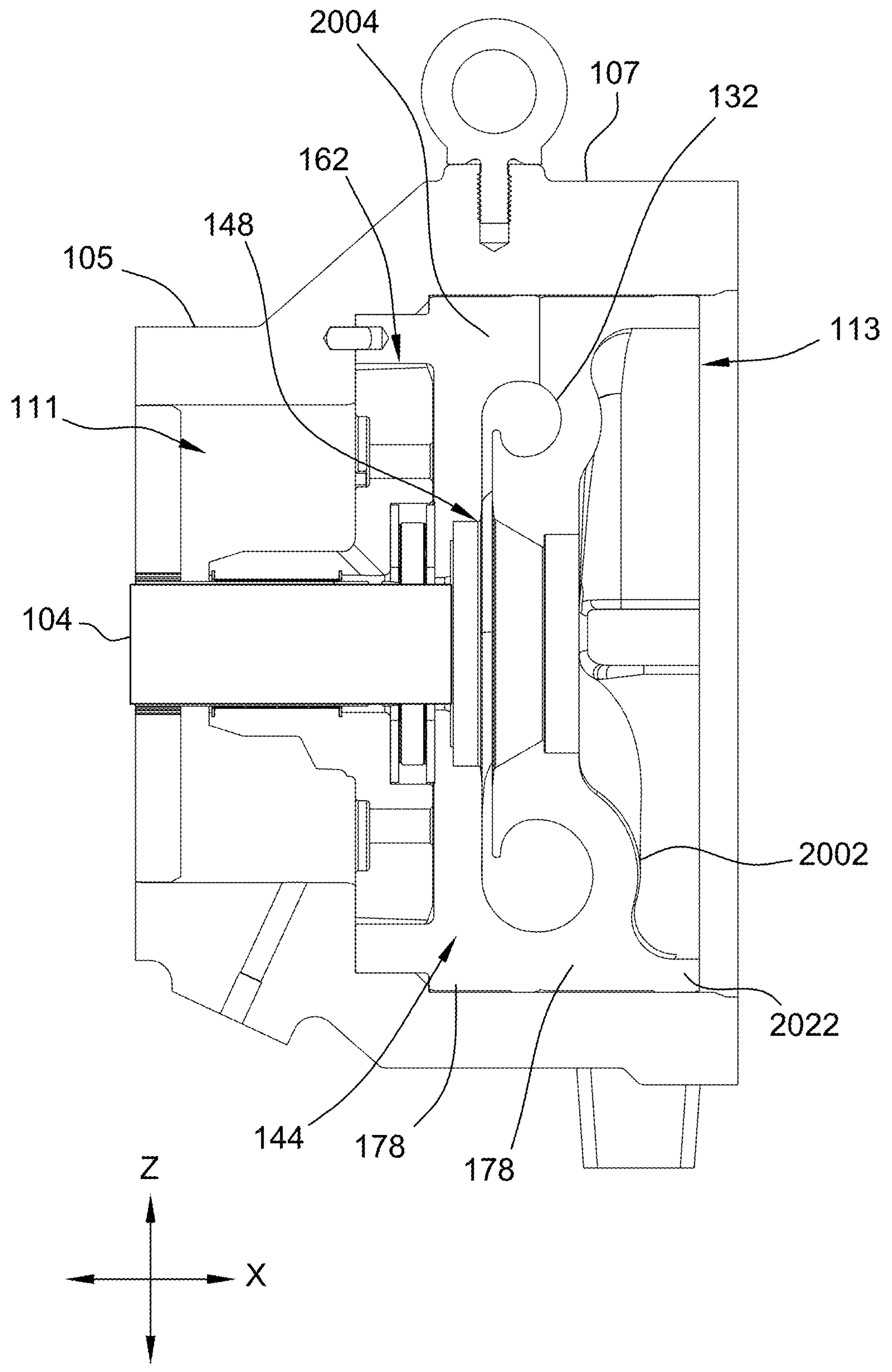
FIGS. 23-25 depict a stage of assembling the compressor shown in FIG. 1, in which the diffuser plate of FIGS. 20-22 is positioned in the compressor housing adjacent the volute plate of FIGS. 14-19.
Figure 24:
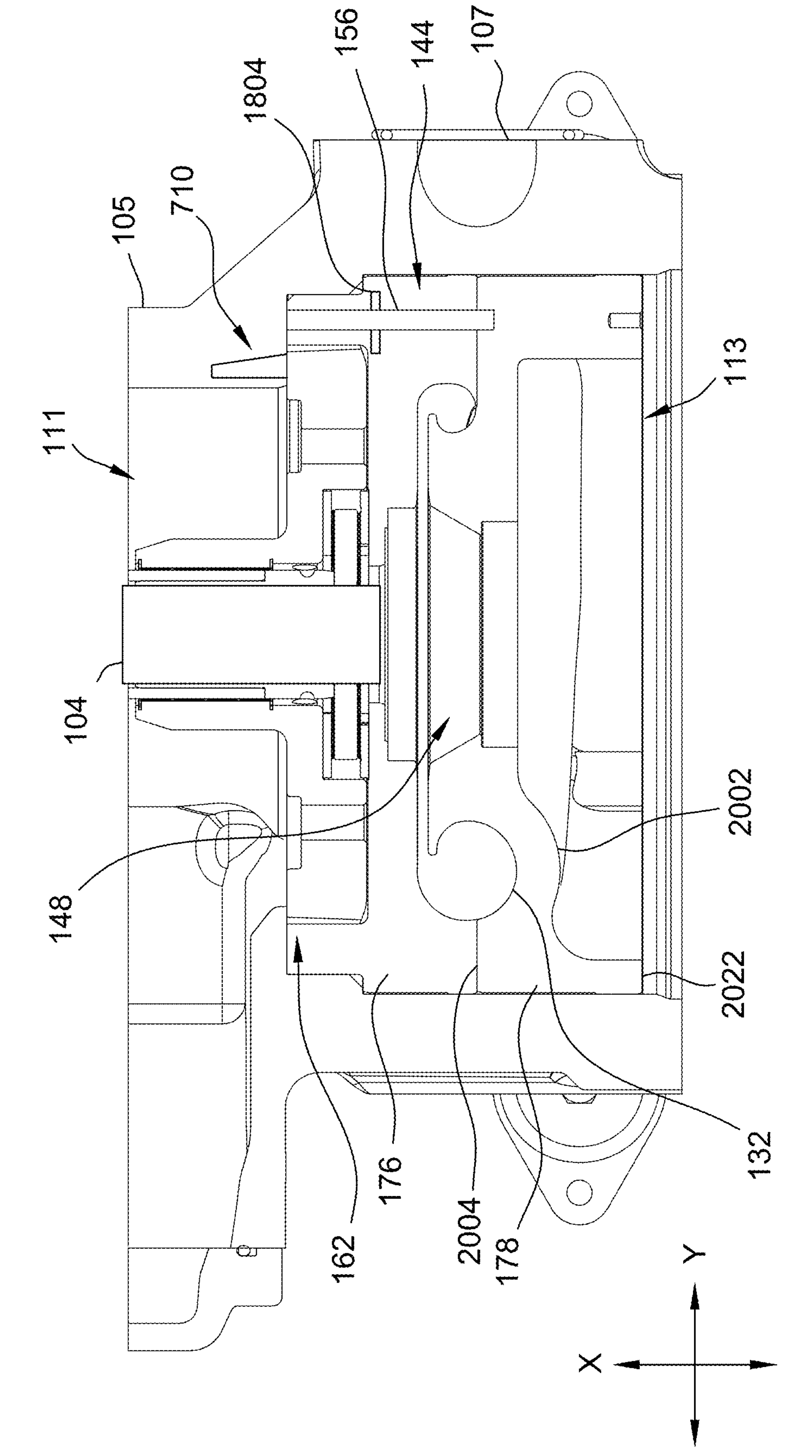
Figure 25:
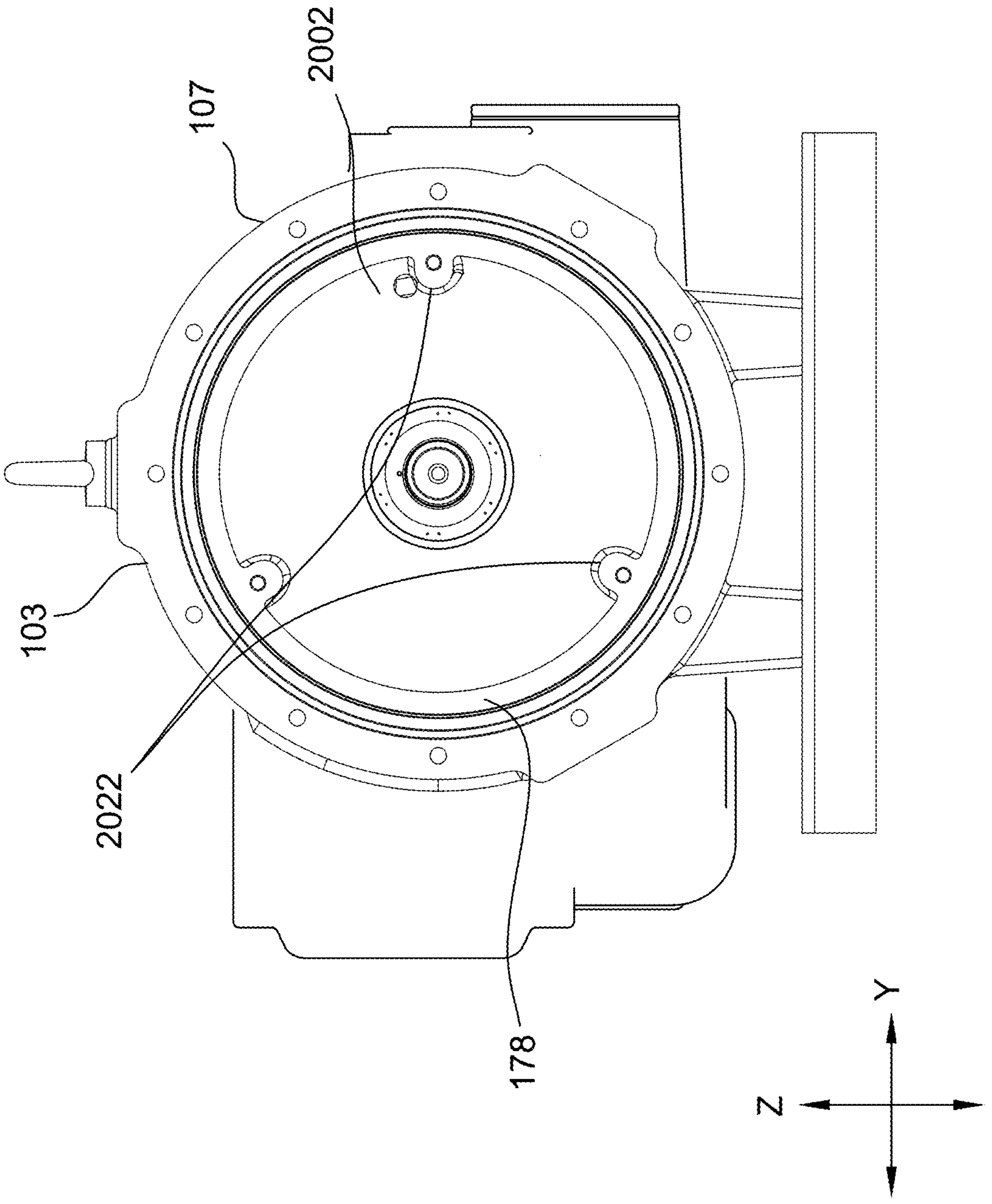

Referring to FIG. 31, the method 3100 also includes positioning 3106 the first volute assembly 144 in the compressor housing 102 adjacent the bearing housing 162. As shown in FIG. 6, in the example compressor 100, the volute assembly 144 includes a volute plate 176 and a diffuser plate 178. The volute plate 176 and the diffuser plate 178 are sequentially positioned and installed in the compressor housing 102 and cooperatively form the volute assembly 144 and define the sealed cavity 132. The volute plate 176 is shown isolated in FIGS. 14-16 and positioning of the volute plate 176 in the compressor housing 102 with the fit band 117 is shown in FIGS. 17-19. The diffuser plate 178 is shown isolated in FIGS. 20-22 and positioning of the diffuser plate 178 in the compressor housing 102 with the fit band 117 is shown in FIGS. 23-25.

Illustration and description of the first volute assembly 144 and positioning the first volute assembly 144 in the compressor housing 102 applies to the second volute assembly 146 unless expressly stated otherwise or the context clearly indicates otherwise. As shown in FIG. 6, like the first volute assembly 144, the second volute assembly 146 includes a volute plate 180 and a diffuser plate 182. In the example compressor 100, the volute plate 180 of the second volute assembly 146 has similar elements and components as the volute plate 176 of the first volute assembly 144, and the diffuser plate 182 of the second volute assembly 146 has similar elements and components as the diffuser plate 178 of the first volute assembly 144. The volute plate 180 and the diffuser plate 182 are sequentially positioned and installed in the compressor housing 102 and cooperatively form the second volute assembly 146 and define the sealed cavity 138. The second volute assembly 146 is positioned adjacent the second bearing housing 166, and the datum 130 is used as a common reference surface for axially positioning and aligning the second bearing housing 166 and the second volute assembly 146 in the compressor housing 102 similar as described for the first bearing housing 162 and the first volute assembly 144 which use the datum 128 as a common reference surface.

Figure 15:
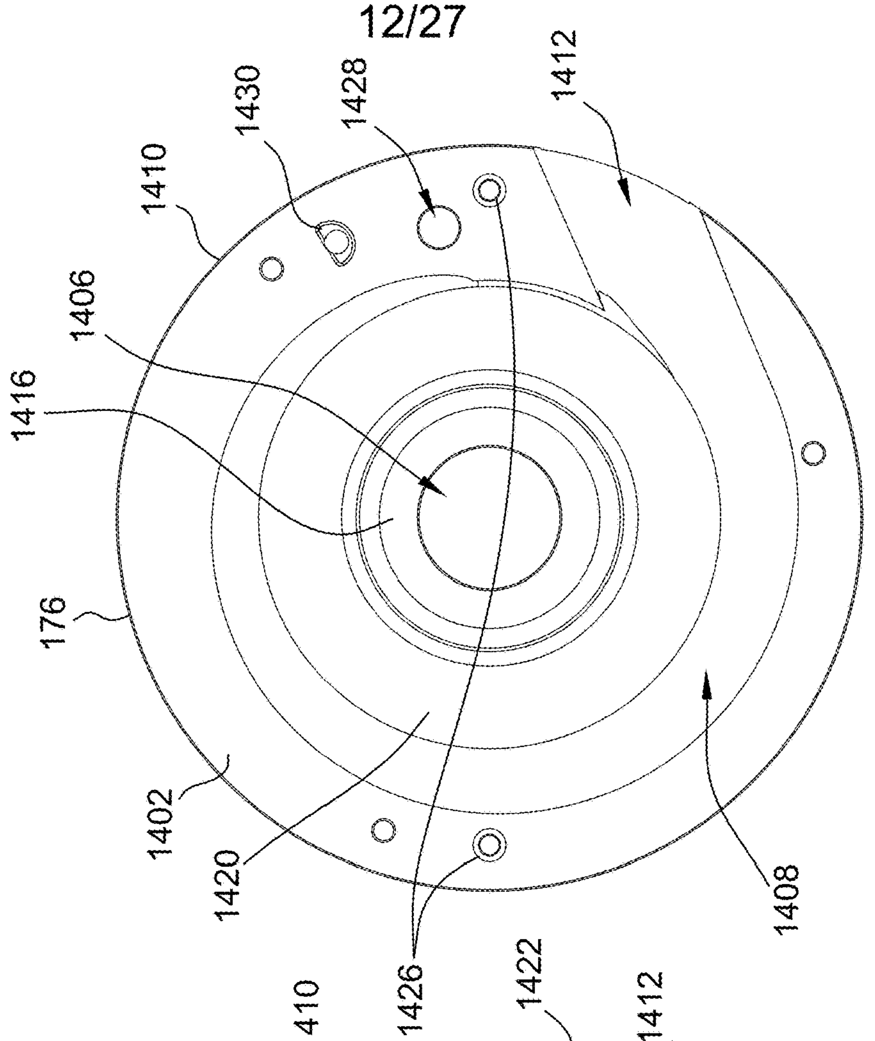
FIGS. 14-16 are isolated views of a volute plate of the compressor shown in FIG. 1.
Figure 14:
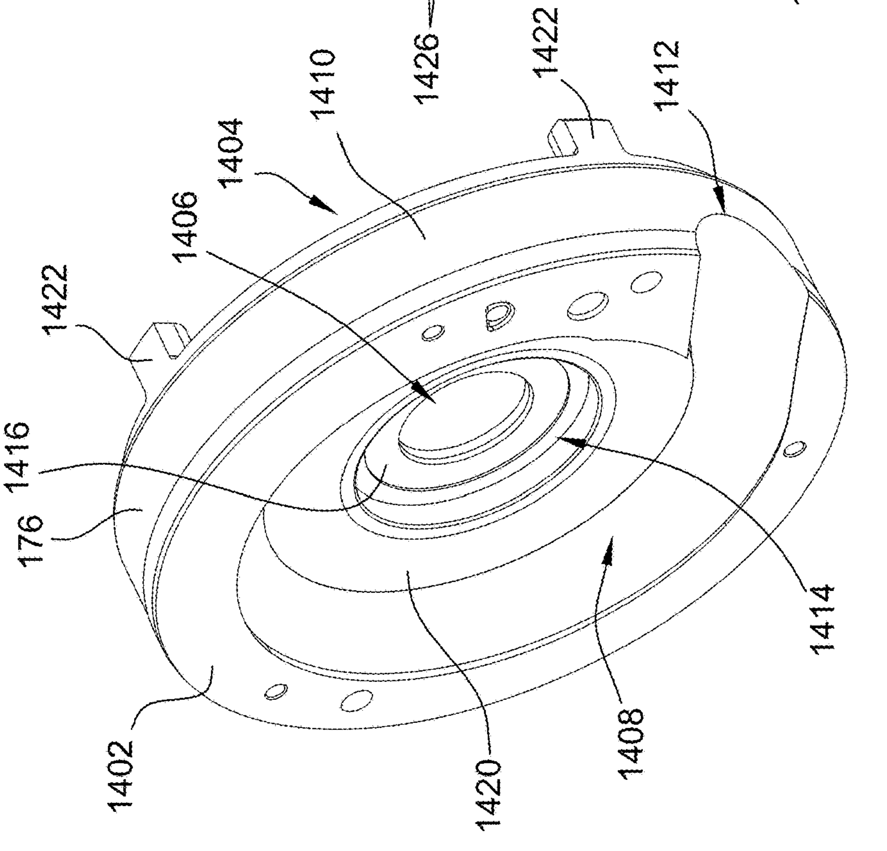
Figure 16:
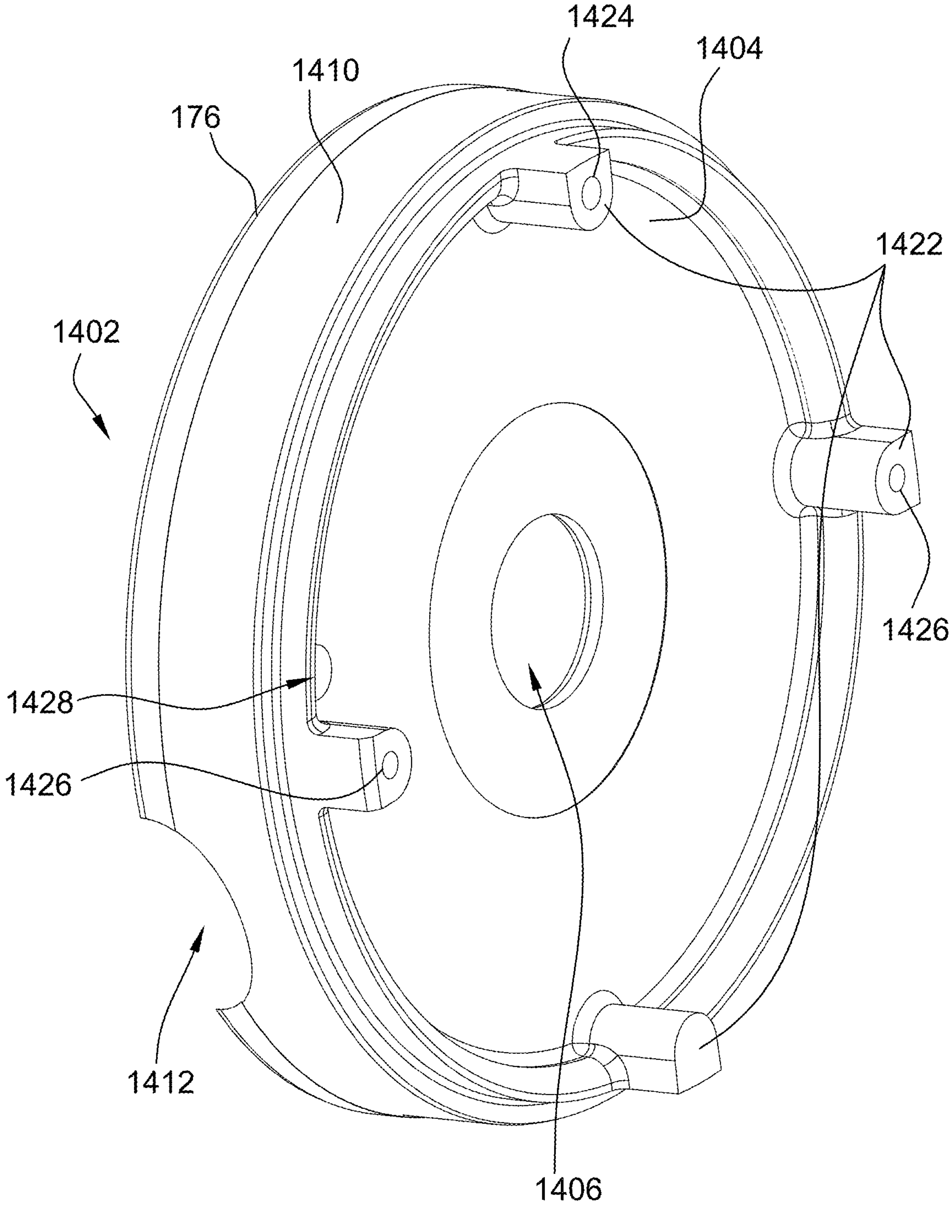

Referring to FIGS. 14-16, the volute plate 176 is disk-shaped and includes two opposing axial surfaces 1402, 1404 and a radial edge 1410 that joins the axial surfaces 1402, 1404. The volute plate 176 also defines a center hole 1406 extending between the axial surfaces 1402, 1404. The center hole 1406 receives and/or enables access to the shaft 104 when the volute plate 176 is positioned in the compressor housing 102. A first volute channel 1408 and a first diffuser surface 1420 are defined in a first, or front, axial surface 1402 of the volute plate 176. The first volute channel 1408 extends in a spiral shape about the first diffuser surface 1420 to an open end 1412 defined in the radial edge 1410 of the volute plate 176. The first volute channel 1408 forms a portion of the volute of the sealed cavity 132 of the volute assembly 144 as described below. The first diffuser surface 1420 forms a portion of the diffuser of the sealed cavity 132 of the volute assembly 144 as described below.

The volute plate 176 also includes a center recessed area 1414 defined in the front axial surface 1402. The center recessed area 1414 defines a recessed surface 1416 that is recessed from the first volute channel 1408 and the first diffuser surface 1420. The recessed surface 1416 extends radially between the center hole 1406 and the first diffuser surface 1420. The first diffuser surface 1420 extends radially between the recessed surface 1416 and the first volute channel 1408. The recessed area 1414 and recessed surface 1416 form a portion of the impeller area 148 of the volute assembly 144 as described below.

The volute plate 176 also includes a second, or back, axial surface 1404 and one or more stops 1422 (e.g., lugs or tabs) protruding from the back axial surface 1404. The stops 1422 correspond to the slots 824 defined in the flange 802 of the bearing housing 162. Each one of the stops 1422 passes through one of the slots 824 of the bearing housing 162 and abuts the datum 128, described below. The stops 1422 are each sized, shaped, and positioned to pass through a respective one of the slots 824 and abut the datum 128 without the stops 1422 or the back axial surface 1404 contacting the front axial surface 810 of the flange 802 of the bearing housing 162. Alternatively, when the stops 1422 pass through the slots 824 and abut the datum 128, the front axial surface 810 of the bearing housing 162 and the back axial surface 1404 of the volute plate 176 may at least partially contact one another.

The stops 1422 are arranged circumferentially about the back axial surface 1404 and located adjacent the radial edge 1410, corresponding to the circumferential arrangement and position of the slots 824 of the bearing housing 162. In the example volute plate 176, there are four stops 1422, each stop 1422 being spaced approximately 90° from each adjacent stop 1422, corresponding to the four slots 824 described above. The number of stops 1422 may be the same as the number of slots 824, or fewer stops 1422 than slots 824 may be included in the volute plate 176. The circumferential spacing of the stops 1422 may vary depending on the number of stops 1422 as well as the spacing of the slots 824. Any suitable number of stops 1422 may be included, with any suitable variation in the size, shape, position, and arrangement of the stops 1422, to enable the volute assembly 144 to abut the datum 128.

The volute plate 176 also includes an alignment opening 1424 defined in one of the stops 1422. The alignment opening 1424 corresponds to the alignment aperture 708 defined in the axial surface of the datum 128. An alignment member 1702 (see FIG. 17), such as a pin or dowel, is inserted into the alignment opening 1424 and the corresponding alignment aperture 708 to angularly align the volute plate 176 relative to the main body 103 of the compressor housing 102 and the bearing housing 162. In the example volute plate 176, there is one alignment opening 1424 in one stop 1422. Alternatively, more of the stops 1422 may include an alignment opening 1424 corresponding to an alignment aperture 708 on the datum 128, or none of the stops 1422 may include an alignment opening 1424.

The volute plate 176 also includes a set of fastener holes 1426 defined in at least some of the other stops 1422. In the example volute plate 176, there are two fastener holes 1426 defined in two stops 1422. Alternatively, more stops 1422 or all the stops 1422 may include a fastener hole 1426. The fastener holes 1426 each extend from the front axial surface 1402 through a respective one of the stops 1422. Each one of fastener holes 1426 corresponds to one of the fastener apertures 704 defined in the axial surface of the datum 128. A fastener 1902 (see FIG. 19), such as a bolt, is inserted through each pair of a fastener hole 1426 and an aperture 704 to attach (e.g., bolt) the volute plate 176 to the main body 103 of the compressor housing 102, and more particularly, to the datum 128.

The volute plate 176 also includes a second coolant hole 1428 extending between the axial surfaces 1402, 1404. The second coolant hole 1428 cooperatively forms the internal fluid passage 156 with the bearing housing 162 and the diffuser plate 178 as described below. The second coolant hole 1428 also enables angularly aligning the volute plate 176 relative to the bearing housing 162, described below. The second coolant hole 1428 is connected to the first coolant hole 818 of the bearing assembly 162 when the volute plate 176 is positioned in the compressor housing 102.

The volute plate 176 also includes an alignment bore 1430 defined in the front axial surface 1402. The alignment bore 1430 receives an alignment member 1704 (FIG. 17), such as a pin or a dowel, that enables angularly aligning the diffuser plate 178 relative to the volute plate 176, described below.

FIGS. 17-19 depict the volute plate 176 positioned in the main body 103 of the compressor housing 102 adjacent the bearing housing 162. The front axial surface 1402 of the volute plate 176 faces the socket 113 of the main body 103 of the compressor housing 102. The back axial surface 1404 of the volute plate 176 faces the bearing housing 162. The center hole 1406 of the volute plate 176 (FIGS. 14-16) is coaxially aligned with the shaft 104 along the longitudinal axis $A_{104}$ (see FIGS. 4 and 5) and enables access to the shaft 104. The shaft 104 may be received in the center hole 1406 or may terminate slightly prior to the center hole 1406. The stops 1422 of the volute plate 176 pass through the slots 824 of the bearing housing 162 and each stop 1422 abuts the datum 128, which locates the volute plate 176. The datum 128 thus operates as a common reference surface for axially positioning and aligning each of the volute plate 176 and the bearing housing 162 in the compressor housing 102.

Additionally, in the example compressor 100, when the volute plate 176 is positioned in the main body 103, the volute plate 176 is attached (e.g., bolted) to the main body 103 of the compressor housing 102 and, more particularly, to the datum 128 using the fasteners 1902 (e.g., bolts) that are inserted through each pair of a fastener hole 1426 in the volute plate 176 and an aperture 704 in the datum 128. Each of the volute plate 176 and the bearing housing 162 is thus attached (e.g., bolted) to the datum 128, which eliminates the need to attach the volute plate 176 to the bearing housing 162 and minimizes tolerance stack therebetween.

The alignment member 1702 is also inserted into the alignment opening 1424 of the volute plate 176 (see FIG. 16) and the corresponding alignment aperture 708 of the datum 128 (see FIG. 7) to angularly align the volute plate 176 relative to the main body 103 and the bearing housing 162. Angularly aligning the volute plate 176 relative to the main body 103 and the bearing housing 162 achieves several objectives. For example, angular alignment of the volute plate 176 relative to the bearing housing 162 ensures that the second coolant hole 1428 of the volute plate 176 is aligned with the first coolant hole 818 of the bearing housing 162 for forming the internal fluid passage 156 (FIG. 5). In the example compressor 100, a tube 1802 (FIG. 18) that forms the internal fluid passage 156 is inserted in each of the coolant holes 818, 1428. The tube 1802 operates to create a fluid-tight path for the internal fluid passage 156 as well as to angularly align the bearing housing 162 and the volute plate 176. Angular alignment of the volute plate 176 relative to the main body 103 also ensures that the open end 1412 of the first volute channel 1408 is aligned with the first refrigerant exit 114 of the compressor housing 102. As shown in FIGS. 17 and 18, the first refrigerant exit 114 is defined in a side of the first end section 107 of the main body 103.

Figure 20:
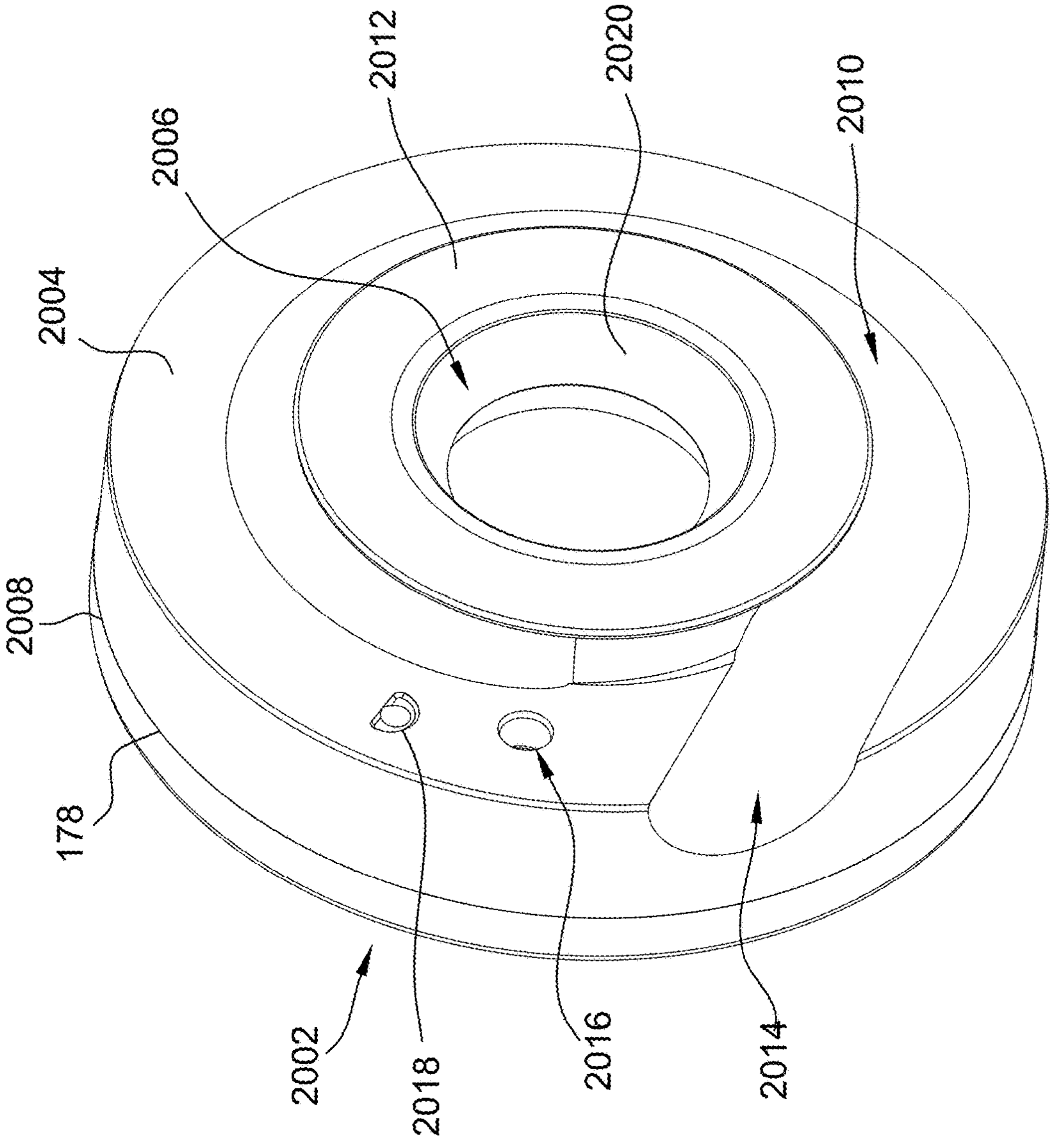
FIGS. 20-22 are isolated views of a diffuser plate of the compressor shown in FIG. 1.
Figure 21:
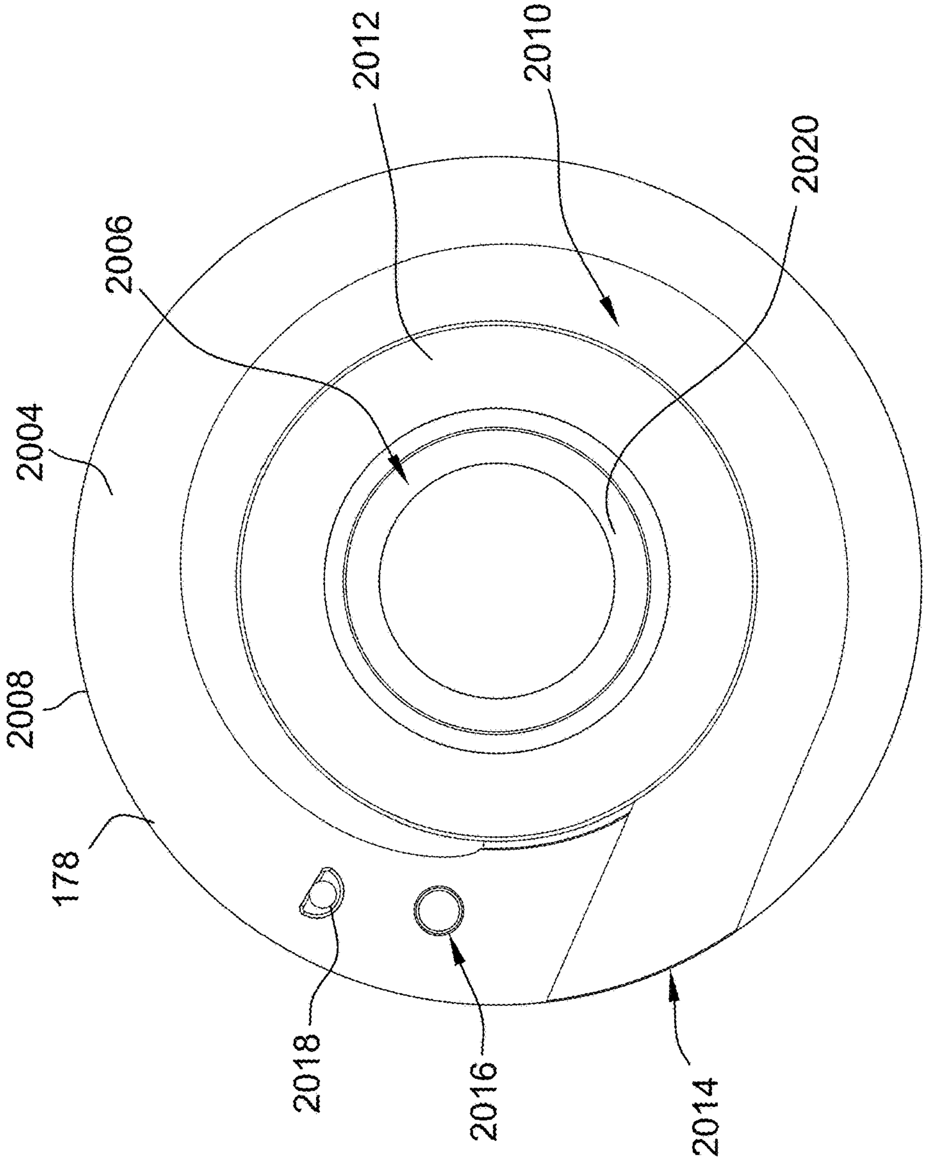

As described above, when the volute plate 176 is positioned in the compressor housing 102 and the stops 1422 abut the datum 128, the back axial surface 1404 of the volute plate 176 is spaced from the bearing housing 162 relative to the longitudinal axis $A_{104}$. Referring to FIGS. 20-22, the diffuser plate 178 is disk-shaped and complements a shape of the volute plate 144 to form the volute assembly 144. The diffuser plate 178 includes two opposing axial surfaces 2002, 2004 and a radial edge 2008 that joins the axial surfaces 2002, 2004. The volute plate 176 also defines a center hole 2006 extending between the axial surfaces 2002, 2004. The center hole 2006 aligns with the center hole 1406 of the volute plate 176 along the longitudinal axis $A_{104}$ and enables access to the shaft 104 when the diffuser plate 178 is positioned in the compressor housing 102. A second volute channel 2010 and a second diffuser surface 2012 are defined in a second, or back, axial surface 2004 of the diffuser plate 178. The second volute channel 2010 complements the first volute channel 1408 of the volute plate 176 and extends in a spiral shape about the second diffuser surface 2012 to an open end 2014 defined in the radial edge 2008 of the diffuser plate 178. The second volute channel 2010 cooperates with the first volute channel 1408 of the volute plate 176 to form the volute of the sealed cavity 132 of the volute assembly 144. The second diffuser surface 2012 projects axially outward from the volute channel 1408. The second diffuser surface 2012 cooperates with the first diffuser surface 1420 to form the diffuser of the sealed cavity 132 of the volute assembly 144. In various embodiments, the volute assembly 144 includes a second fit band 117-B configured to position the volute assembly 144 to axially align with the compressor housing 102. The second fit band 117-B includes a raised portion of the volute assembly 144 that interfaces with a corresponding raised portion on the compressor housing 102. The fit band 117 radially positions the volute assembly 144 within the case 102 of the compressor to reduce radial stack-up.

The diffuser plate 178 also includes a tapered surface 2020 defined in the back axial surface 2004. The tapered surface 2020 extends radially between the center hole 2006 and the second diffuser surface 2012. The second diffuser surface 2012 extends radially between the tapered surface 2020 and the second volute channel 2010. The tapered surface 2020 cooperates with the recessed surface 1416 of the volute plate 176 to form the impeller area 148 of the volute assembly 144.

The diffuser plate 178 also includes an alignment opening 2018 defined in the back axial surface 2004. The alignment opening 2018 corresponds to the alignment bore 1430 defined in the front axial surface 1402. The alignment member 1704 (see FIG. 17), such as a pin or dowel, is inserted into the alignment opening 2018 and the corresponding alignment bore 1430 to angularly align the diffuser plate 178 relative to the volute plate 176. In the example diffuser plate 178, the alignment opening 2018 is used to angularly align the diffuser plate 178 relative to the volute plate 176 without attaching (e.g., fastening) the diffuser plate 178 to the volute plate 176. This reduces the scope of machining required at the interface between the first volute plate 176 and the diffuser plate 178 (e.g., by eliminating the need to machine aligning pairs of fastener holes in the volute plate 176 and the diffuser plate 178). As a result, the assembly process of the volute assembly 144 is greatly simplified and easily repeatable with reduced tolerance stack. In other examples, the volute plate 176 and the diffuser plate 178 may be attached together using fasteners.

Figure 29:
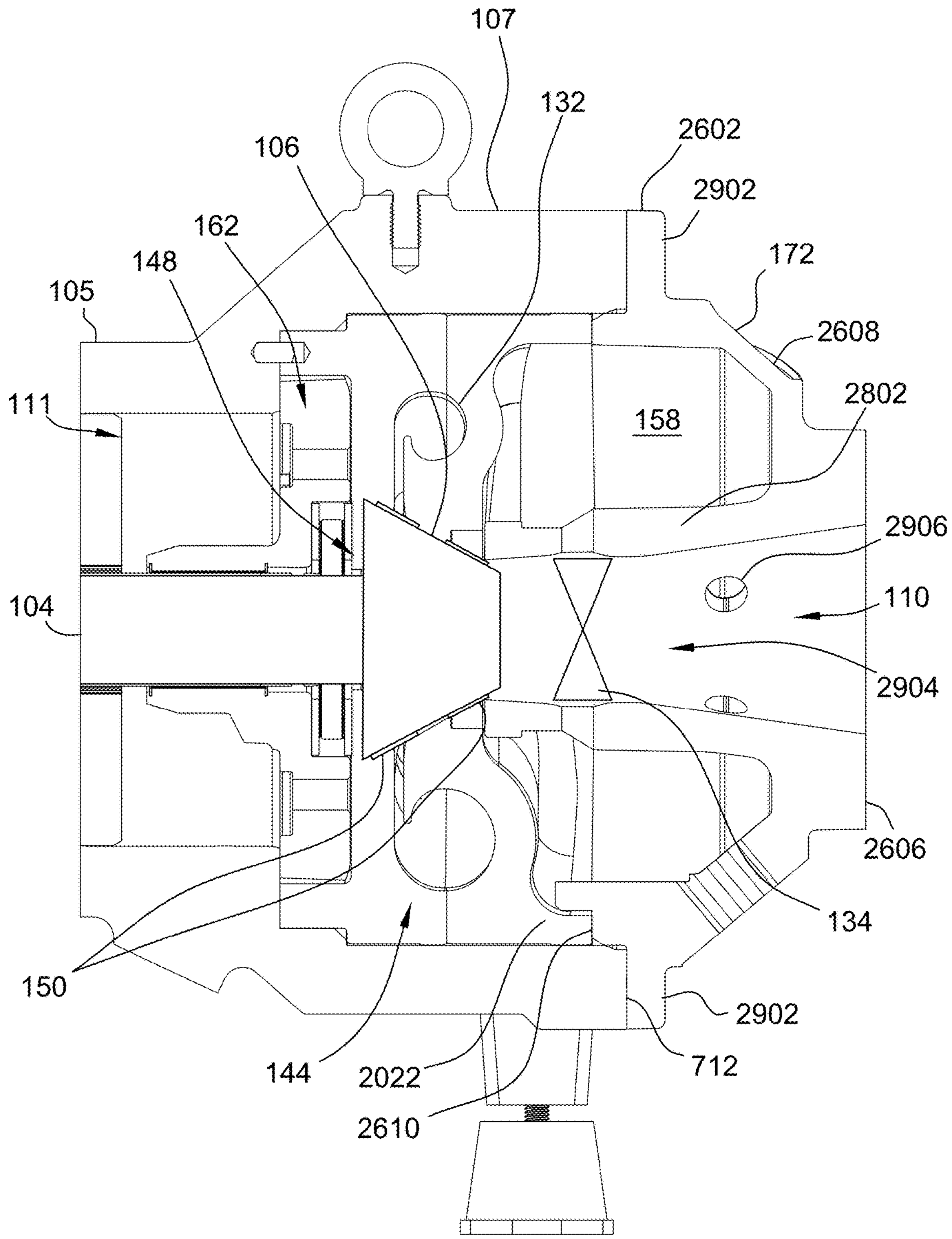
FIGS. 29 and 30 depict a stage of assembling the compressor shown in FIG. 1, in which the end cap of FIGS. 26-28 is connected to the compressor housing.

Referring to FIGS. 29 and 30, with the volute assembly 144 positioned 3106 in the compressor housing 102, the impeller 106 is positioned in the impeller area 148 of the volute assembly 144 and attached to (or mounted on) the shaft 104. The impeller 106 may be attached to the shaft 104 using any suitable attachment means, such as bolts, tie rods, welding, press fit, and the like. In some examples, the impeller 106 is attached to the shaft 104 as described in U.S. Pat. No. 11,560,900, which is incorporated by reference in its entirety. Illustration and description of the first impeller 106 attached to the shaft 104 and positioned in the impeller area 148 applies to the second impeller 116 attached to the shaft 104 and positioned in the impeller area 152 of the second volute assembly 146 unless expressly stated otherwise or the context clearly indicates otherwise.

When the impeller 106 is positioned in the impeller area 148, the mechanical seals 150 are also installed between the first impeller 106 and the first volute assembly 144 to fluidly seal the impeller 106 in the impeller area 148. As described above, the seals 150 operate to limit or inhibit the refrigerant being moved by the impeller 106 into the sealed cavity 132 from leaking out from the impeller area 148.

FIGS. 23-25 depict the diffuser plate 178 positioned in the main body 103 of the compressor housing 102 adjacent the volute plate 176, thereby forming the volute assembly 144 which defines the sealed cavity 132 and the impeller area 148. The front axial surface 2002 of the diffuser plate 178 faces the socket 113 of the main body 103 of the compressor housing 102. The back axial surface 2004 of the diffuser plate 178 faces the front axial surface 1402 of the volute plate 176. The center hole 2006 of the diffuser plate 178 (FIGS. 20-22) is coaxially aligned with the center hole 1406 of the volute plate 176 and with the shaft 104 along the longitudinal axis $A_{104}$ (see FIGS. 4 and 5) and enables access to the shaft 104. When the diffuser plate 178 is positioned adjacent the volute plate 176 to form the volute assembly 144, the first and second volute channels 1408, 2010 cooperatively form the volute of the sealed cavity 132, the first and second diffuser surfaces 1420, 2012 cooperatively form the diffuser of the sealed cavity 132, and the recessed surface 1416 and the tapered surface 2020 cooperatively form the impeller area 148 of the volute assembly 144.

The alignment member 1704 (FIG. 17) is inserted into the alignment opening 2018 of the diffuser plate 178 (see FIGS. 20 and 21) and the corresponding alignment bore 1430 of the volute plate 176 (see FIG. 15) to angularly align the diffuser plate 178 relative to the volute plate 176. Angularly aligning the diffuser plate 178 relative to the volute plate 176 achieves several objectives. For example, angular alignment between the diffuser plate 178 and the volute plate 176 ensures that the second and third coolant hole 1428, 2016 are aligned, which can further be enabled using the tube 1802 as described above. Angular alignment between the diffuser plate 178 and the volute plate 176 also ensures that the sealed cavity 132 is formed, with the open end 1412 of the first volute channel 1408 and the open end 2014 of the second volute channel 2010 each being aligned with the first refrigerant exit 114 of the compressor housing 102. In particular, the open ends 1412, 2014 cooperate to define an outlet of the sealed cavity 132 that aligns with the first refrigerant exit 114.

As described above, in the example compressor 100, when the diffuser plate 178 is positioned in the compressor housing 102, the volute assembly 144 is formed from the volute plate 176 and the diffuser plate 178 without attaching (e.g., fastening) the volute plate and diffuser plate together. The diffuser plate 178, and thus the volute assembly 144, may be secured in the compressor housing 102 by clamping the diffuser plate 178 and the volute plate 176 together via an axial clamping force exerted on the diffuser plate 178 by the end cap 172. To enable such an axial clamping force, the diffuser plate 178 includes protrusions 2022 (see FIGS. 23-25) that protrude axially from the front axial surface 2002. The protrusions 2022 contact a surface of the end cap 172, described below, to clamp the diffuser plate 178 to the volute plate 176 and secure the volute assembly 144 in the compressor housing. Further, the compressor 100 may include at least one fit band 117. For example, a second fit 117-B band is positioned on the volute assembly 144 to ensure radial alignment to the centerline of the compressor housing 102. The second fit band 117-B includes a portion of the compressor housing 102 in contact with a portion of the volute assembly 144. The second fit band 117-B may include housing fit band element and a volute assembly fit band element. Each element of the second fit band 117-B is machined to radially align the volute assembly 144 within the compressor housing 102.

Referring to FIG. 31, the method 3100 also includes connecting 3108 the end cap 172 to the main body 103 of the compressor housing 102, and more particularly, to an axial end surface 712 (FIG. 7) of the end section 107 of the main body 103. The end cap 172 secures the volute assembly 144 in the compressor housing 102, and more particularly, clamps the diffuser plate 178 and the volute plate 176 together by exerting an axial clamping force on the diffuser plate 178 when the end cap 172 is connected to the main body 103. Illustration and description of the end cap 172 and connecting the end cap 172 to the main body 103 of the compressor housing 102 applies to the second end cap 174 unless expressly stated otherwise or the context clearly indicates otherwise. For example, like the first end cap 172, the second end cap 174 is connected to the end section 109 of the main body 103 and secures the second volute assembly 146 in the compressor housing 102. In the example compressor 100, the second end cap 174 has similar elements and components as the first end cap 172.

Figure 26:
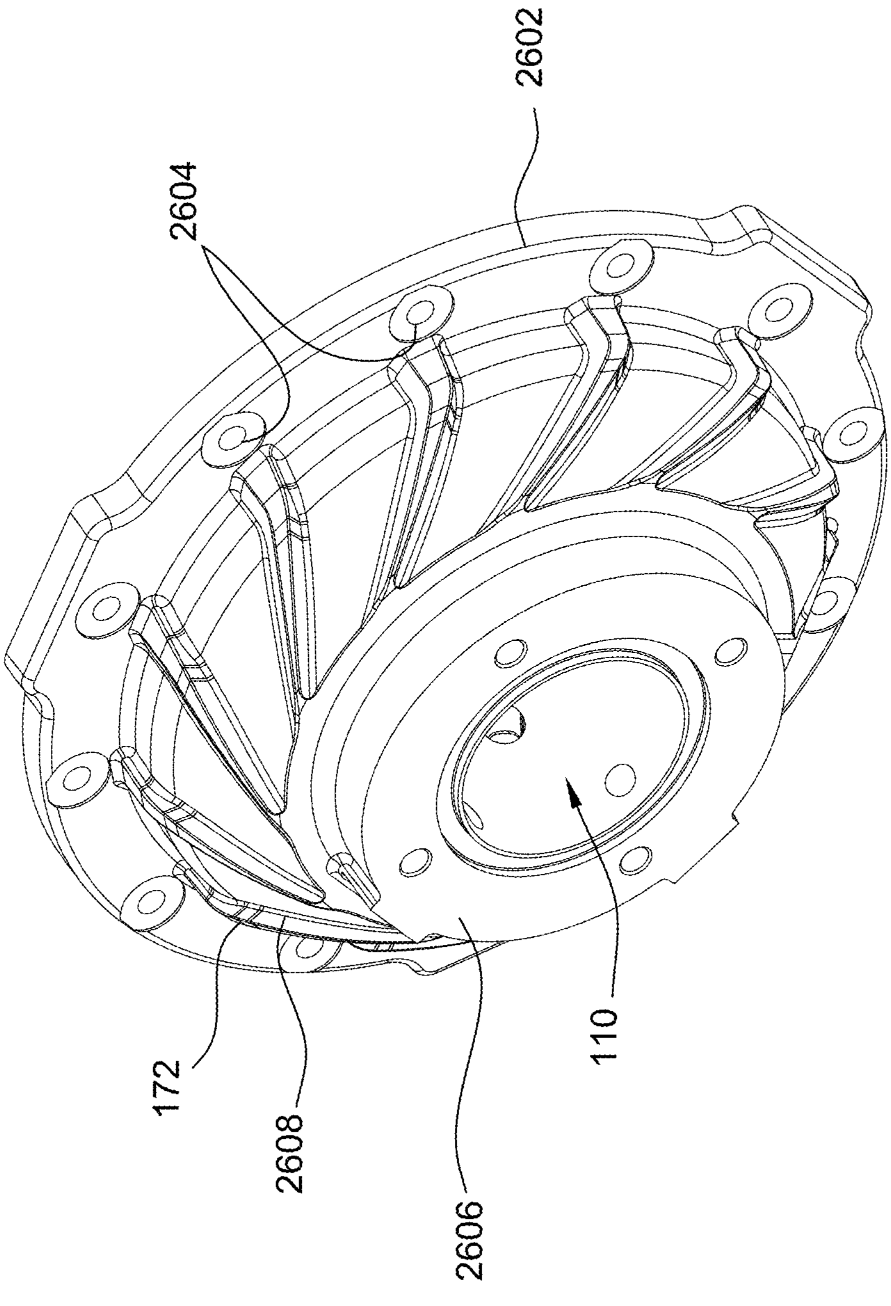
FIGS. 26-28 are isolated views of an end cap of the compressor shown in FIG. 1.
Figure 27:
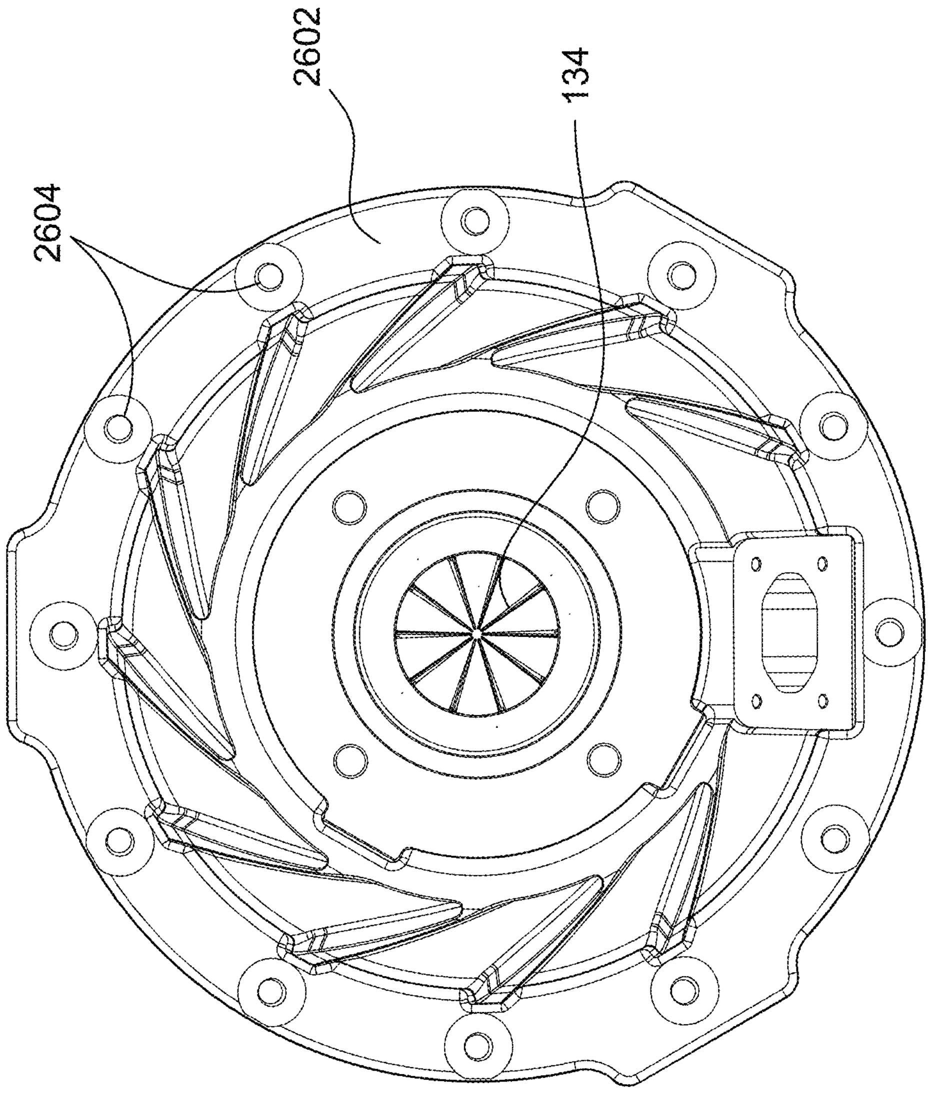
Figure 28:
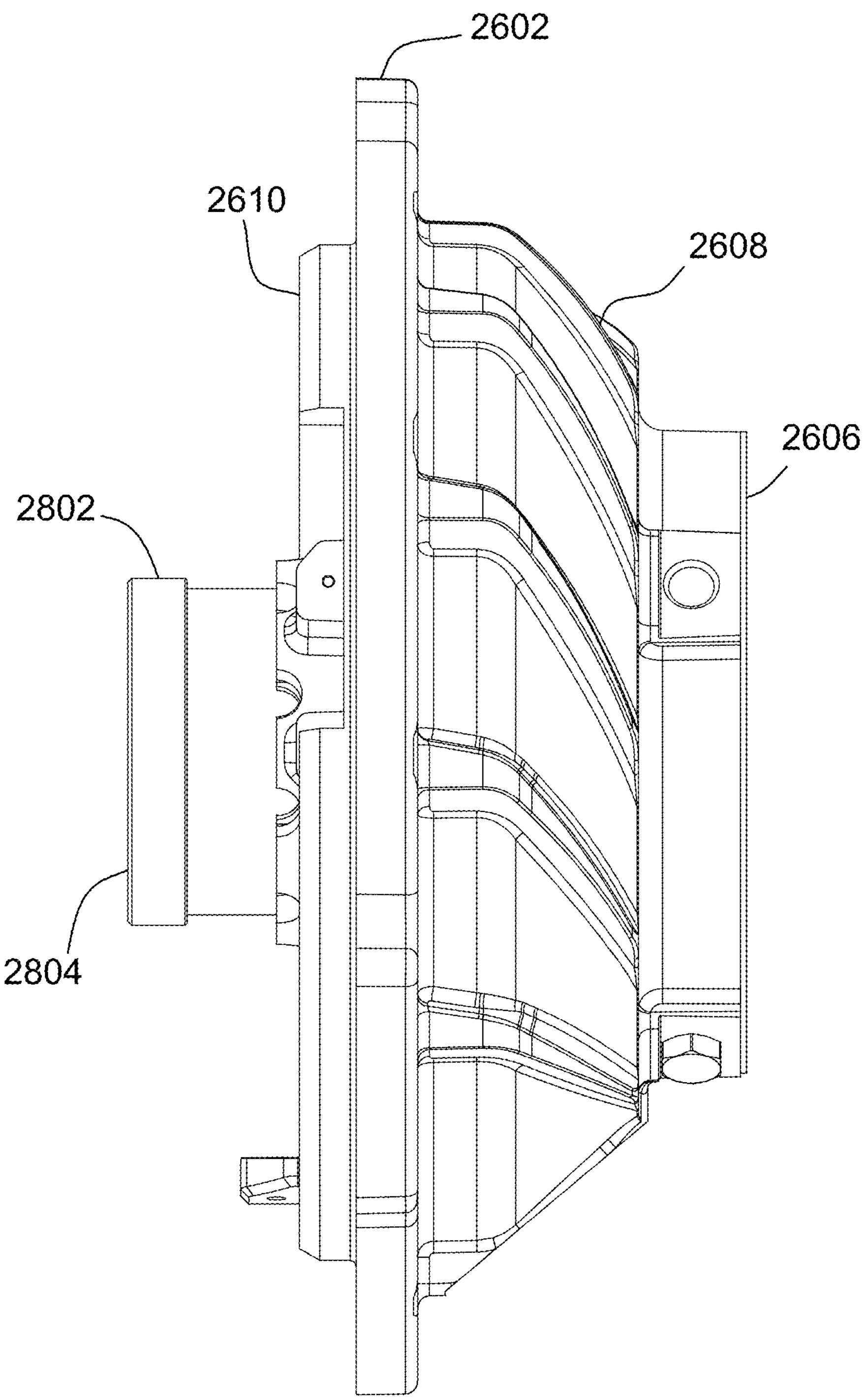

Referring to FIGS. 26-28, the end cap 172 is disk-shaped and includes an outer flange 2602 that connects to the axial end surface 712 (FIG. 7) of the end section 107 of the main body 103. The outer flange 2602 includes a series of holes 2604 that correspond to apertures 714 (FIG. 7) defined in the axial end surface 712. The outer flange 2602 connects to the axial end surface 712 via fasteners 2902 (FIGS. 29 and 30), such as bolts, that are inserted through each pair of a hole 2604 of the outer flange 2602 and an aperture 714 of the axial end surface 712.

The end cap 172 also includes a center opening that defines the inlet 110 of the compressor 100. As shown in FIGS. 27 and 28 and described above, the end cap 172 is combined (or pre-assembled) with first VIGV assembly 134. That is, the end cap 172 and the VIGV assembly 134 are assembled prior to connecting the end cap 172 to the main body 103. Combining, or pre-assembling, the end cap 172 and the VIGV assembly 134 may be performed as described in U.S. patent application Ser. No. 18/186,273, which is incorporated by reference.

The end cap 172 and the VIGV assembly 134 cooperate to form a VIGV housing 2802 for housing a plurality of vanes of the VIGV assembly 134. The VIGV housing 2802 also defines a suction passage 2904 (FIGS. 29 and 30) that connects the refrigerant inlet 110 and the impeller area 148 of the volute assembly 144.

The end cap 172 has a front plate 2606 that defines the refrigerant inlet 110 and a transition section 2608 that extends radially outward and axially from the front plate 2606 to the outer flange 2602. The transition section 2608 is shaped such that the outer flange 2602 is located radially outward from the front plate 2606 and axially offset from the front plate 2606. As such, the front plate 2606 projects axially beyond the outer flange 2602.

The transition section 2608 of the end cap 172 and the end section 107 of the main body 103 cooperate to define the damping chamber 158 in the socket 113. The damping chamber 158 surrounds the VIGV housing 2802 and is connected to the suction passage 2904 via holes 2906 in the housing 2802. The damping chamber 158 is also connected to the motor area 111 via the internal fluid passage 156. Coolant is thus able to flow from the motor area 111, after cooling the motor 108 and/or one or more of the bearing assemblies 160, 164, 168, through the internal fluid passage 156, and into the damping chamber 158. The coolant is then returned to the suction passage 2904 through the housing. Additional detail on the damping chamber 158 and coolant flow through the compressor housing 102 is described in U.S. patent application Ser. No. 18/186,386, which is incorporated by reference.

The end cap 172 also includes a back shoulder 2610 that extends axially from the outer flange 2602, opposite the transition section 2608. The back shoulder 2610 defines the surface that contacts protrusions 2022 of the diffuser plate 178 to clamp the diffuser plate 178 to the volute plate 176 and secure the volute assembly 144 in the compressor housing 102. Additionally, or alternatively, an axial end surface 2804 of the VIGV housing 2802 contacts the front axial surface 2002 of the diffuser plate 178 to clamp the diffuser plate 178 to the volute plate 176 and secure the volute assembly 144 in the compressor housing 102.

FIGS. 29 and 30 depict the end cap 172 connected to the end section 107 of the main body 103 of the compressor housing 102. In particular, the outer flange 2602 of the end cap 172 is attached (e.g., bolted) to the axial end surface 712 of the end section 107 of the main body 103 via the fasteners 2902 (e.g., bolts). The back shoulder 2610 and the VIGV housing 2802 of the end cap 172 face the diffuser plate 178. One or both of the back shoulder 2610 and the VIGV housing 2802 of the end cap 172 contact the front axial surface 2002 of the diffuser plate 178 to clamp the diffuser plate 178 and the volute plate 176, securing the volute assembly 144. The end cap 172, together with the end section 107 and the front axial surface 2002 of the diffuser plate 178, define the damping chamber 158 in the socket 113. The transition section 2608 of the end cap 172 encloses the socket 113 and the front plate 2606 of the end cap 172 defines the refrigerant inlet 110. The VIGV housing 2802 defines the suction passage 2904 that connects the refrigerant inlet 110 and the impeller area 148 of the volute assembly 144. The damping chamber 158 is connected to the suction passage 2904 via the holes 2906.

The center hole 2006 of the diffuser plate 178 (FIGS. 20-22) is coaxially aligned with the center hole 1406 of the volute plate 176 and with the shaft 104 along the longitudinal axis $A_{104}$ (see FIGS. 4 and 5) and enables access to the shaft 104. When the diffuser plate 178 is positioned adjacent the volute plate 176 to form the volute assembly 144, the first and second volute channels 1408, 2010 cooperatively form the volute of the sealed cavity 132, the first and second diffuser surfaces 1420, 2012 cooperatively form the diffuser of the sealed cavity 132, and the recessed surface 1416 and the tapered surface 2020 cooperatively form the impeller area 148 of the volute assembly 144.

The alignment member 1704 (FIG. 17) is inserted into the alignment opening 2018 of the diffuser plate 178 (see FIGS. 20 and 21) and the corresponding alignment bore 1430 of the volute plate 176 (see FIG. 15) to angularly align the diffuser plate 178 relative to the volute plate 176. Angularly aligning the diffuser plate 178 relative to the volute plate 176 achieves several objectives. For example, angular alignment between the diffuser plate 178 and the volute plate 176 ensures that the second and third coolant holes 1428, 2016 are aligned, which can further be enabled using the tube 1802 as described above. Angular alignment between the diffuser plate 178 and the volute plate 176 also ensures that the sealed cavity 132 is formed, with the open end 1412 of the first volute channel 1408 and the open end 2014 of the second volute channel 2010 each being aligned with the first refrigerant exit 114 of the compressor housing 102. In particular, the open ends 1412, 2014 cooperate to define an outlet of the sealed cavity 132 that aligns with the first refrigerant exit 114.

As described above, in the example compressor 100, when the diffuser plate 178 is positioned in the compressor housing 102, the volute assembly 144 is formed from the volute plate 176 and the diffuser plate 178 without attaching (e.g., fastening) the volute plate and diffuser plate together. The diffuser plate 178, and thus the volute assembly 144, may be secured in the compressor housing 102 by clamping the diffuser plate 178 and the volute plate 176 together via an axial clamping force exerted on the diffuser plate 178 by the end cap 172. To enable such an axial clamping force, the diffuser plate 178 includes protrusions 2022 (see FIGS. 23-25) that protrude axially from the front axial surface 2002. The protrusions 2022 contact a surface of the end cap 172, described above, to clamp the diffuser plate 178 to the volute plate 176 and secure the volute assembly 144 in the compressor housing.

Embodiments of the compressor described are simple and efficient to assemble, and require fewer connections between adjacent components (e.g., a bearing housing and volute assembly). Additionally, the embodiments described herein reduce tolerance stack between the adjacent components of the compressor by using a common datum or reference surface. The common datum can also be used as a common connection surface for securing or connecting (e.g., bolting) multiple adjacent components in the compressor, eliminating the need to connect the adjacent components to one another and reducing the scope of machining required at the interface of the components. Reduced tolerance stack provides better control of axial alignment of the bearings and seals, among other components mounted on or in relation to the compressor shaft, and improves the performance, efficiency, and operation lifetime of the compressor.

When introducing elements of the present disclosure or the embodiment(s) thereof, the articles “a,” “an,” “the” and “said” are intended to mean that there are one or more of the elements. The terms “comprising,” “including,” “containing” and “having” are intended to be inclusive and mean that there may be additional elements other than the listed elements. The use of terms indicating a particular orientation (e.g., “top,” “bottom,” “side”, etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A method of assembling a compressor that includes a compressor housing, the compressor housing having a datum, the method comprising:

positioning a motor and a rotatable shaft in the compressor housing;

positioning a bearing housing in the compressor housing, the bearing housing defining a center bore that receives the shaft, wherein positioning the bearing housing comprises abutting the datum with the bearing housing and aligning the compressor housing with the bearing housing using a first fit band; and positioning a volute assembly in the compressor housing adjacent to the bearing housing, the volute assembly comprising a diffuser plate, a volute plate defining a back axial surface of the volute assembly facing the bearing housing, one or more stops protruding from the back axial surface, and a second fit band, wherein positioning the volute assembly comprises:

positioning the volute plate in the compressor housing adjacent the bearing housing;

abutting the datum with the one or more stops and aligning the compressor housing with the volute assembly using the second fit band, wherein abutting the datum with the bearing housing and the one or more stops limits axial tolerance stack between the bearing housing and the volute assembly;

securing the volute plate to the datum via holes extending through the one or more stops that abut the datum; and positioning the diffuser plate in the compressor housing adjacent the volute plate to form the volute assembly;

wherein the first fit band and the second fit band limit axial tolerance stack to a centerline of the compressor housing.

2. The method of claim 1, wherein a radial bearing is positioned in the center bore of the bearing housing for rotatably supporting the shaft, wherein abutting the datum with the bearing housing and the one or more stops limits tolerance stack between the bearing housing and the volute assembly from causing axial misalignment of the radial bearing.

3. The method of claim 1, wherein the volute assembly defines an impeller area, wherein the method further comprises:

attaching an impeller to the shaft such that the impeller is positioned in the impeller area; and sealing the impeller in the impeller area using mechanical seals;

wherein abutting the datum with the bearing housing and the one or more stops limits tolerance stack between the bearing housing and the volute assembly from causing axial misalignment of the mechanical seals.

4. The method of claim 1, further comprising connecting an end cap to the compressor housing and securing the volute assembly in the compressor housing with the end cap.

5. The method of claim 1, wherein the bearing housing includes one or more slots, wherein positioning the volute assembly comprises passing each one of the stops through one of the slots to abut the datum.

6. The method of claim 1, wherein positioning the volute assembly comprises angularly aligning the volute assembly relative to the bearing housing.

7. The method of claim 6, wherein angularly aligning the volute assembly relative to the bearing housing comprises inserting an alignment member through the bearing housing and the volute assembly.

8. The method of claim 1, wherein each fit band comprises a raised portion.

9. The method of claim 1, wherein a diameter of each fit band is less than a diameter of the compressor housing.

10. The method of claim 1, further comprising securing the bearing housing to the datum prior to positioning the volute assembly in the compressor housing.

11. The method of claim 1, further comprising angularly aligning the diffuser plate relative to the volute plate using one or more alignment members.

12. The method of claim 1, further comprising positioning a thrust disk between the bearing housing and the back axial surface of the volute assembly.

13. The method of claim 1, further comprising:

assembling an inlet guide vane assembly with an end cap; and connecting the end cap assembled with the inlet guide vane assembly to the compressor housing.

14. The method of claim 1, wherein the compressor housing has a second datum, the method further comprising:

positioning a second bearing housing in the compressor housing, the second bearing housing defining a second center bore that receives the shaft, wherein positioning the second bearing housing comprises abutting the second datum with the second bearing housing; and positioning a second volute assembly in the compressor housing adjacent the second bearing housing, the second volute assembly having a second back axial surface facing the second bearing housing and one or more stops protruding from the second back axial surface, wherein positioning the second volute assembly comprises abutting the second datum with the one or more stops, wherein abutting the second datum with the second bearing housing and the one or more stops of the second volute assembly limits tolerance stack between the second bearing housing and the second volute assembly.

* * * * *